(12) United States Patent
Dutkiewicz et al.

(10) Patent No.: US 11,267,218 B2
(45) Date of Patent: Mar. 8, 2022

(54) NONWOVEN CLEANING SUBSTRATE

(71) Applicant: Georgia-Pacific Nonwovens LLC, Atlanta, GA (US)

(72) Inventors: Jacek K. Dutkiewicz, Cordova, TN (US); Brian Fong, Lakeland, TN (US); Arinne Lyman, Greenville, WI (US)

(73) Assignee: Glatfelter Corporation, Charlotte, NC (US)

( * ) Notice: Subject to any disclaimer, the term of this patent is extended or adjusted under 35 U.S.C. 154(b) by 0 days.

(21) Appl. No.: 16/069,449

(22) PCT Filed: Jan. 12, 2017

(86) PCT No.: PCT/US2017/013168
§ 371 (c)(1),
(2) Date: Jul. 11, 2018

(87) PCT Pub. No.: WO2017/123740
PCT Pub. Date: Jul. 20, 2017

(65) Prior Publication Data
US 2019/0152187 A1    May 23, 2019

Related U.S. Application Data

(60) Provisional application No. 62/277,935, filed on Jan. 12, 2016.

(51) Int. Cl.
*B32B 5/02* (2006.01)
*B32B 5/08* (2006.01)
(Continued)

(52) U.S. Cl.
CPC ............. *B32B 5/022* (2013.01); *A47L 13/16* (2013.01); *A47L 13/17* (2013.01); *B32B 5/08* (2013.01);
(Continued)

(58) Field of Classification Search
CPC ........... B32B 5/022; B32B 7/022; B32B 7/02; B32B 5/08; B32B 5/26; A47L 13/16;
(Continued)

(56) References Cited

U.S. PATENT DOCUMENTS 2,345,543 A    3/1944  Wohnsiedler et al.
2,926,116 A    2/1960  Keim
(Continued)

FOREIGN PATENT DOCUMENTS

CN    1898081 A      1/2007
CN    105208989 A    12/2015
(Continued)

OTHER PUBLICATIONS

International Search Report dated May 8, 2017 in International Application No. PCT/US2017/013168.
(Continued)

*Primary Examiner* — Vincent Tatesure
(74) *Attorney, Agent, or Firm* — Blank Rome LLP

(57) ABSTRACT

The presently disclosed subject matter relates to nonwoven materials and their use in cleaning articles. More particularly, the nonwovens are layered structures including a rough outer surface which are useful for scrubbing and cleaning purposes.

11 Claims, 12 Drawing Sheets

--- layer 1 = 30 gsm bico (Fibervision 5.7 dtex, 4 mm eccentric bico)

layer 2 = 7.2 gsm of bico (Trevira Type 257, 1.5 dtex, 6 mm) mixed with 21.6 gsm of pulp (GP 4723, fully treated from Leaf River)

1.25 gsm binder (Vinnapas 192)

US 11,267,218 B2
Page 2

(51) Int. Cl.
*B32B 5/26* (2006.01)
*C11D 17/04* (2006.01)
*D04H 11/00* (2006.01)
*B32B 7/02* (2019.01)
*D04H 1/498* (2012.01)
*A47L 13/16* (2006.01)
*D04H 13/00* (2006.01)
*B32B 7/022* (2019.01)
*A47L 13/17* (2006.01)

(52) U.S. Cl.
CPC ............... *B32B 5/26* (2013.01); *B32B 7/02* (2013.01); *B32B 7/022* (2019.01); *C11D 17/049* (2013.01); *D04H 1/498* (2013.01); *D04H 11/00* (2013.01); *D04H 13/00* (2013.01); *B32B 2250/02* (2013.01); *B32B 2250/20* (2013.01); *B32B 2255/26* (2013.01); *B32B 2262/02* (2013.01); *B32B 2262/0253* (2013.01); *B32B 2262/0276* (2013.01); *B32B 2262/062* (2013.01); *B32B 2262/065* (2013.01); *B32B 2262/067* (2013.01); *B32B 2262/12* (2013.01); *B32B 2262/14* (2013.01); *B32B 2307/50* (2013.01); *B32B 2307/538* (2013.01); *B32B 2307/546* (2013.01); *B32B 2307/734* (2013.01); *B32B 2432/00* (2013.01)

(58) Field of Classification Search
CPC ...... A47L 13/17; C11D 17/049; D04H 1/498; D04H 11/00; D04H 13/00
USPC ........................................................ 442/327
See application file for complete search history.

(56) References Cited

U.S. PATENT DOCUMENTS

| | | | |
|---|---|---|---|
| 2,926,154 A | 2/1960 | Keim | |
| 3,556,932 A | 1/1971 | Coscia et al. | |
| 3,556,933 A | 1/1971 | Williams et al. | |
| 3,700,623 A | 10/1972 | Keim | |
| 3,772,076 A | 11/1973 | Keim | |
| 4,098,996 A | 7/1978 | Ryan et al. | |
| 4,425,186 A | 1/1984 | May et al. | |
| 4,432,833 A | 2/1984 | Breese | |
| 4,603,176 A | 7/1986 | Bjorkquist et al. | |
| 4,605,702 A | 8/1986 | Guerro et al. | |
| 4,731,269 A | 3/1988 | Hansen et al. | |
| 5,372,885 A | 12/1994 | Tabor et al. | |
| 5,456,982 A | 10/1995 | Hansen et al. | |
| 5,466,337 A | 11/1995 | Darlington et al. | |
| 5,492,759 A | 2/1996 | Eriksson et al. | |
| 5,547,541 A | 8/1996 | Hansen et al. | |
| 5,601,921 A | 2/1997 | Eriksson | |
| 5,776,308 A | 7/1998 | Sears et al. | |
| 5,935,383 A | 8/1999 | Sun et al. | |
| 6,017,417 A | 1/2000 | Wendt et al. | |
| 6,159,335 A | 12/2000 | Owens et al. | |
| 6,559,081 B1 | 5/2003 | Erspamer et al. | |
| 6,592,960 B1* | 7/2003 | Suzuki ............... | D04H 1/54 26/2 R |
| 2003/0045197 A1 | 3/2003 | Kakiuchi et al. | |
| 2006/0121811 A1* | 6/2006 | Mangold ............. | D04H 1/55 442/392 |
| 2007/0134478 A1 | 6/2007 | Haberer et al. | |
| 2010/0139021 A1 | 6/2010 | Bergsten et al. | |
| 2012/0177888 A1 | 7/2012 | Escafere et al. | |
| 2015/0208892 A1 | 7/2015 | Policicchio et al. | |

FOREIGN PATENT DOCUMENTS

| | | | |
|---|---|---|---|
| WO | | 2015073429 A1 | 5/2015 |
| WO | WO 2017/059034 A1 | | 4/2017 |

OTHER PUBLICATIONS

Stamm, "Swelling of Wood and Fiberboards in Liquid Ammonia," Forest Products Journal 5(6):413-416 (1955).

Office Action received for EP Application No. 17701260.6, dated Feb. 24, 2021, 7 Pages.

\* cited by examiner

| layer 1 = 30 gsm bico (Fibervision 5.7 dtex, 4 mm eccentric bico) |
|---|
| layer 2 = 7.2 gsm of bico (Trevira Type 257, 1.5 dtex, 6 mm) mixed with 21.6 gsm of pulp (GP 4723, fully treated from Leaf River) |
| 1.25 gsm binder (Vinnapas 192) |

| layer 1 = 38 gsm bico (Fibervision 5.7 dtex, 4 mm eccentric bico) |
|---|
| layer 2 = Polymer Group Inc's 12 gsm, untreated, polypropylene spunbond (scrim code = MOR-B0137) |

NONWOVEN CLEANING SUBSTRATE

1. REFERENCE TO RELATED APPLICATIONS

This application is a U.S. National Stage Patent Application under 35 U.S.C. § 371 of International Application No. PCT/US2017/013168, filed on Jan. 12, 2017, which claims priority to U.S. Provisional Application Ser. No. 62/277,935, filed Jan. 12, 2016, the contents of each of which are hereby incorporated by reference in their entirety.

2. FIELD OF THE INVENTION

The presently disclosed subject matter relates to new nonwoven materials and their use in cleaning articles. More particularly, the presently disclosed subject matter relates to layered structures containing a rough outer surface useful for scrubbing and cleaning purposes.

3. BACKGROUND OF THE INVENTION

Nonwoven materials are important in a wide range of cleaning articles, including cleaning wipes, cloths, and sheets. Nonwoven materials made from synthetic and cellulose fibers are suitable for cleaning applications because they can be a disposable and cost-effective single-use alternative to existing fabric cloths and sponges. In some applications, the nonwoven materials are treated with a cleaning solution to create a nonwoven infused with a cleaning agent to aid in dirt, stain, or odor removal. The cleaning solution may also have biocidal properties to disinfect surfaces. Wet wipes often attract and collect particles better than dry alternatives, although dry wipes may have electrostatic properties to assist in attracting and collecting such particles.

Cleaning wipes are used in a broad range of applications, including household, personal care, and industrial applications. It is desirable to have a durable wipe that does not disintegrate upon use. For cleaning purposes, ideal materials are flexible in order to conform to the surface being cleaned. It is also beneficial to create thinner wipes that require less material and which are simple to manufacture. Additionally, for purposes of dirt and stain removal, it is advantageous to create a wipe with a rough outer surface that can be used to scrub and loosen particles on tacky or stained surfaces.

However, there remains a need for a durable nonwoven material including a rough outer surface that can be used in cleaning and scrubbing applications. The disclosed subject matter addresses these needs.

4. SUMMARY

The presently disclosed subject matter provides for a multi-layer nonwoven material comprising at least two layers, at least three layers, at least four layers, or at least five layers, where each of the layers has a specific layered construction. In each of the disclosed embodiments, the nonwoven material includes a layer with at least one rough outer surface. The rigidity of the rough outer surface is controlled by the temperature at which the nonwoven material is stabilized or by otherwise heating the outer layer of the nonwoven material. The rough outer surface of the nonwoven material is suitable for cleaning applications.

In certain embodiments, the disclosed subject matter provides for a multi-layer nonwoven material having a first outer layer containing synthetic fibers and a second outer layer containing cellulose fibers and/or synthetic fibers. The first outer layer can have a static coefficient of friction ranging from about 0.01 to about 3.0 and a kinetic coefficient of friction ranging from about 0.0001 to about 2.0.

In particular embodiments, at least one of the first outer layer and the second outer layer of the multi-layer nonwoven material includes binder. The synthetic fibers of the first outer layer can be bicomponent fibers. The second outer layer can contain both cellulose fibers and synthetic fibers. In certain embodiments, the multi-layer nonwoven material can further have an intermediate layer. The intermediate layer can contain cellulose fibers and/or bicomponent fibers.

In particular embodiments, the first outer layer contains bicomponent fibers having a dtex value that is greater than the dtex value of bicomponent fibers in the second outer layer. The multi-layer nonwoven material can further have a first intermediate layer between the first outer layer and the second outer layer. The first intermediate layer can contain cellulose fibers. The multi-layer nonwoven material can further have a second intermediate layer that is adjacent to the first outer layer. The second intermediate layer can contain bicomponent fibers. The multi-layer nonwoven material can further have a third intermediate layer that is adjacent to the second outer layer. The third intermediate layer can contain bicomponent fibers.

5. BRIEF DESCRIPTION OF THE DRAWINGS

Figures 1, 2, 3:
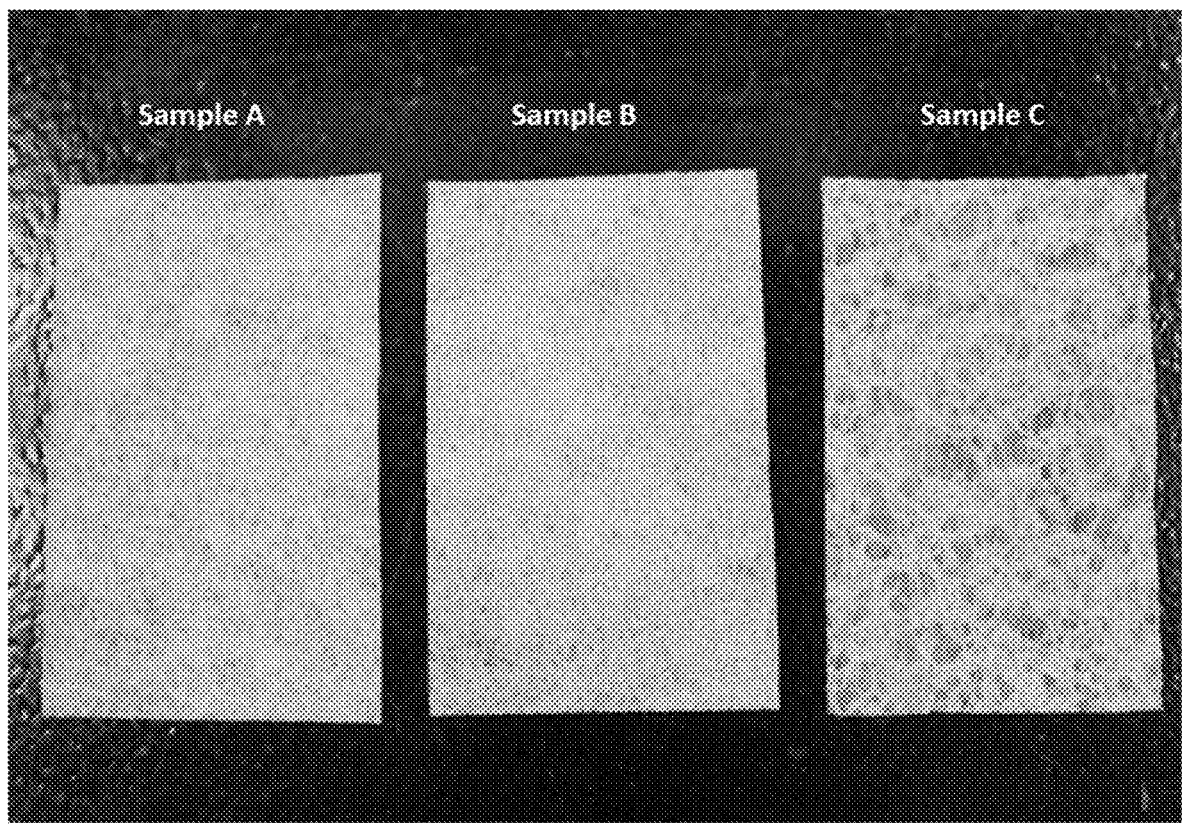
FIG. 1 depicts the two-layer nonwoven material of Example 1. Note that in FIG. 1 and subsequent Figures, rows correspond to layers of the material and provide the composition of each layer.
FIG. 2 depicts the two-layer nonwoven material of Example 2.

FIG. 3 provides photographs of the rough outer surfaces of three samples of the two-layer nonwoven material of Example 2. Each sample was stabilized at a different temperature.

Figure 4:
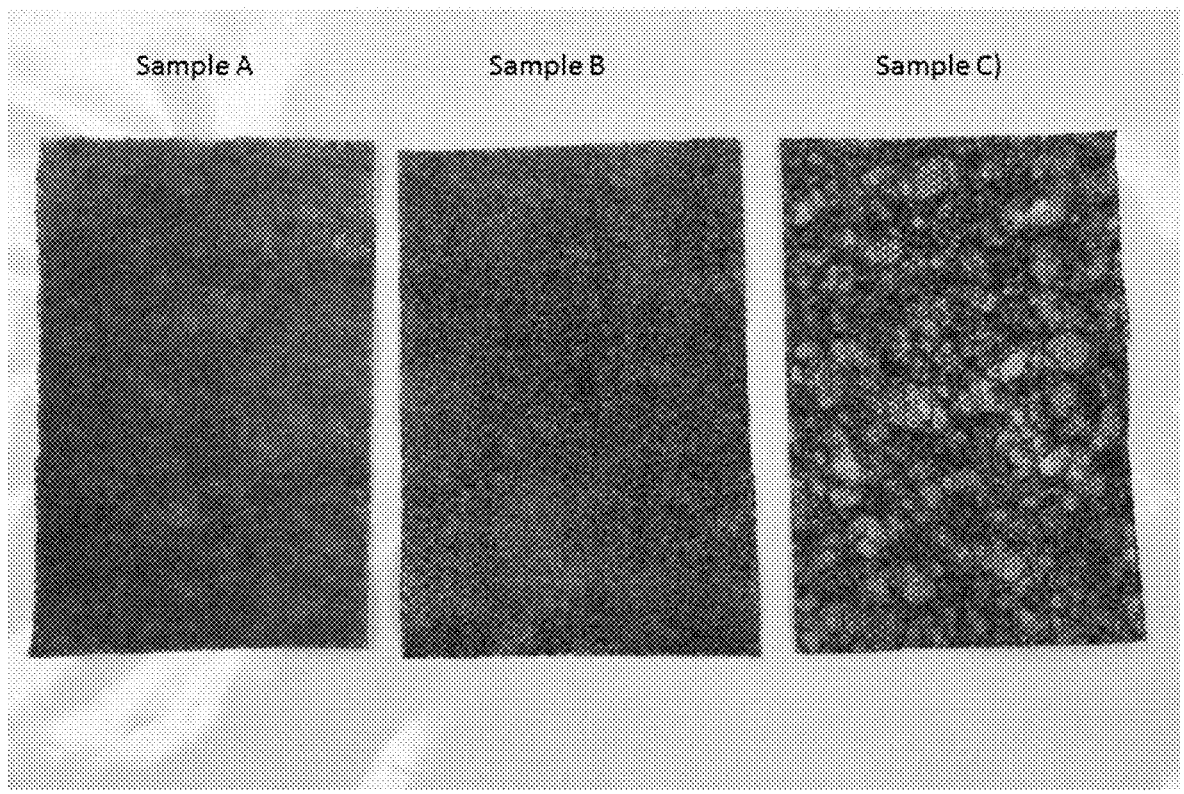

FIG. 4 provides photographs of the rough outer surfaces of three samples of the two-layer nonwoven material of Example 2. The outer surface is dyed to provide contrast. Each sample was stabilized at a different temperature.

Figure 5:
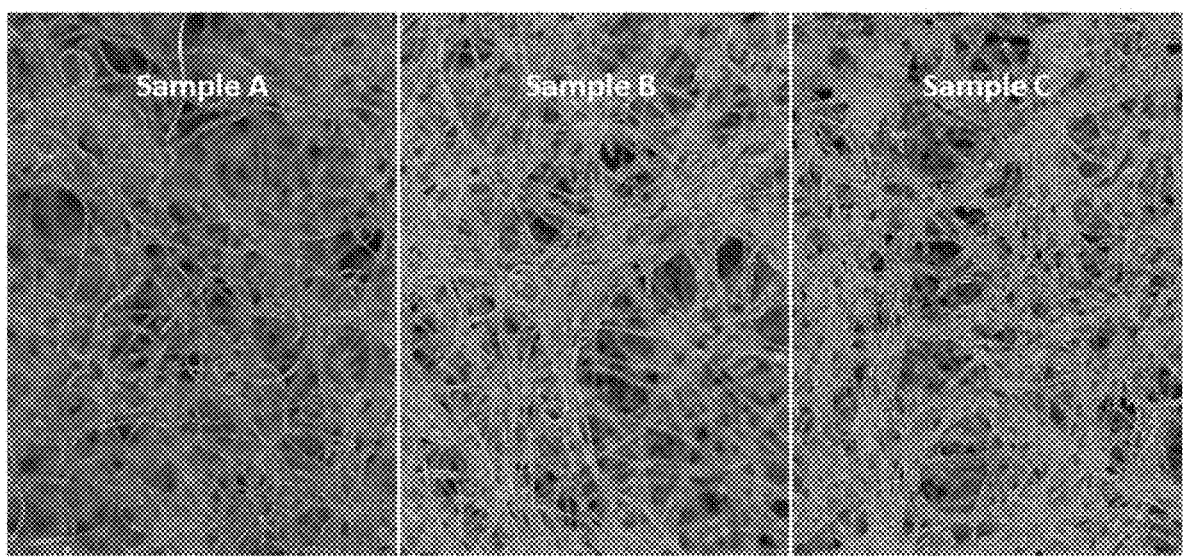

FIG. 5 provides microphotographs of the rough outer surfaces of three samples of the two-layer nonwoven material of Example 2. Each sample was stabilized at a different temperature.

Figure 6:
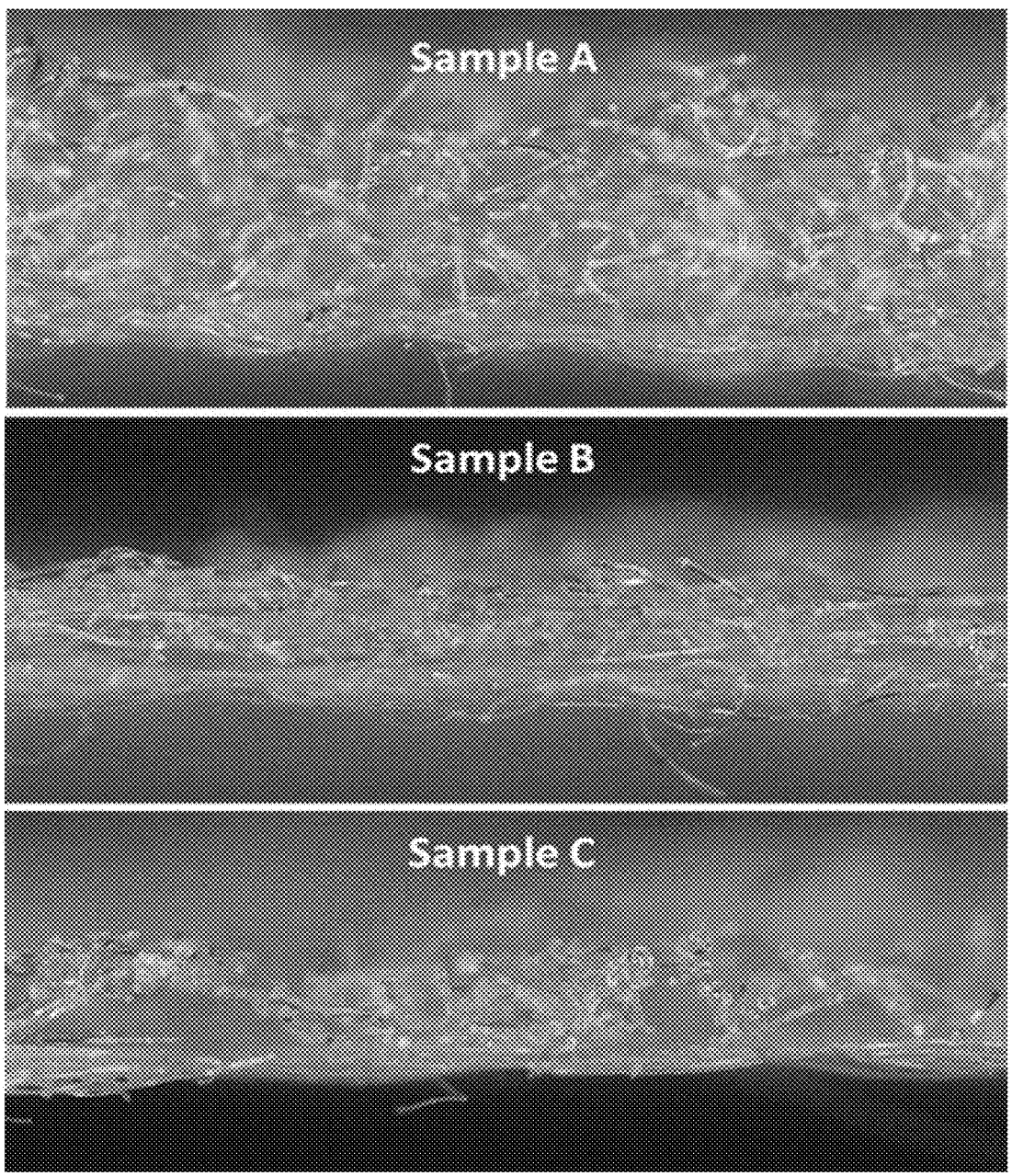

FIG. 6 provides microphotographs of the cross-sections of three samples of the two-layer nonwoven material of Example 2. Each sample was stabilized at a different temperature.

Figure 7A:
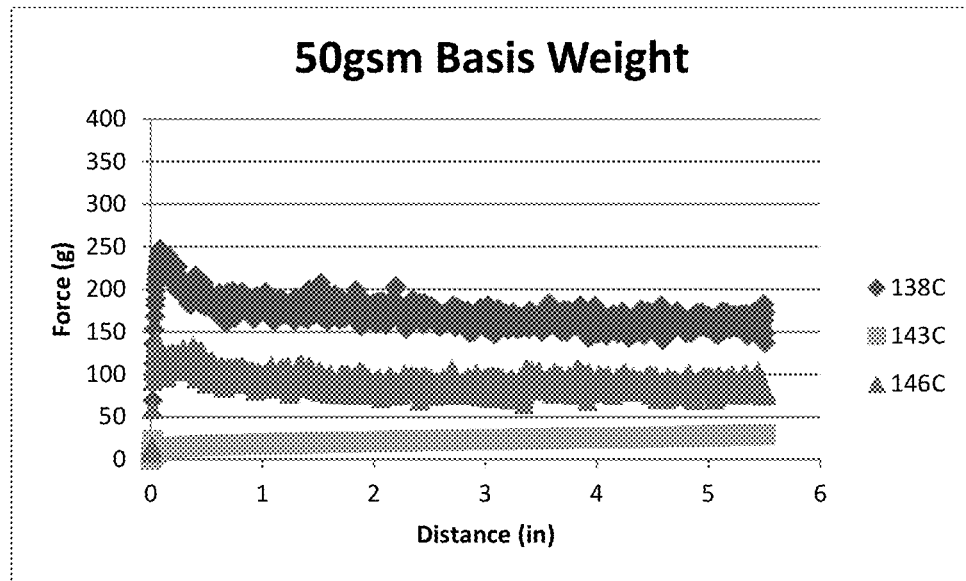
Figure 7B:
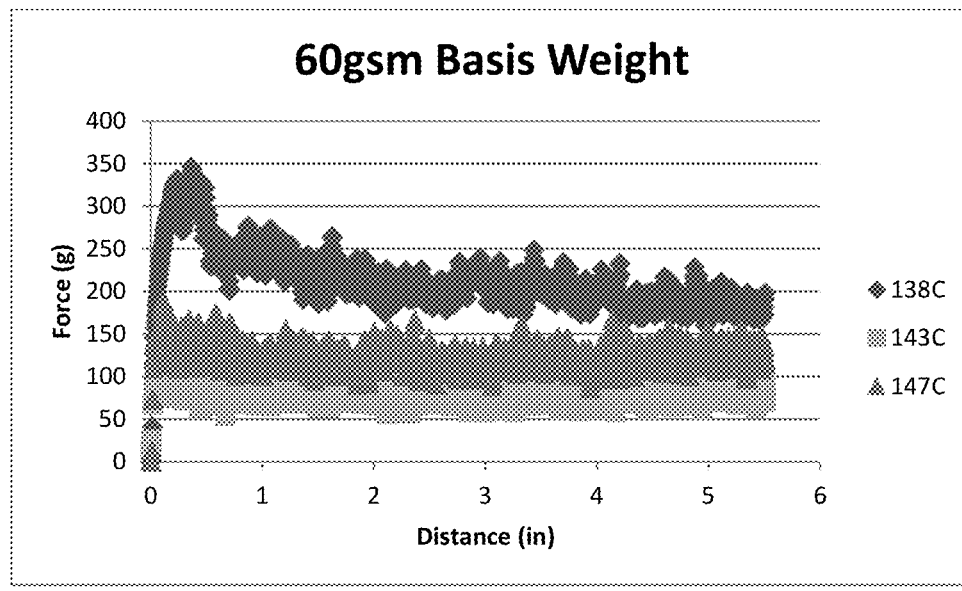
Figure 7C:
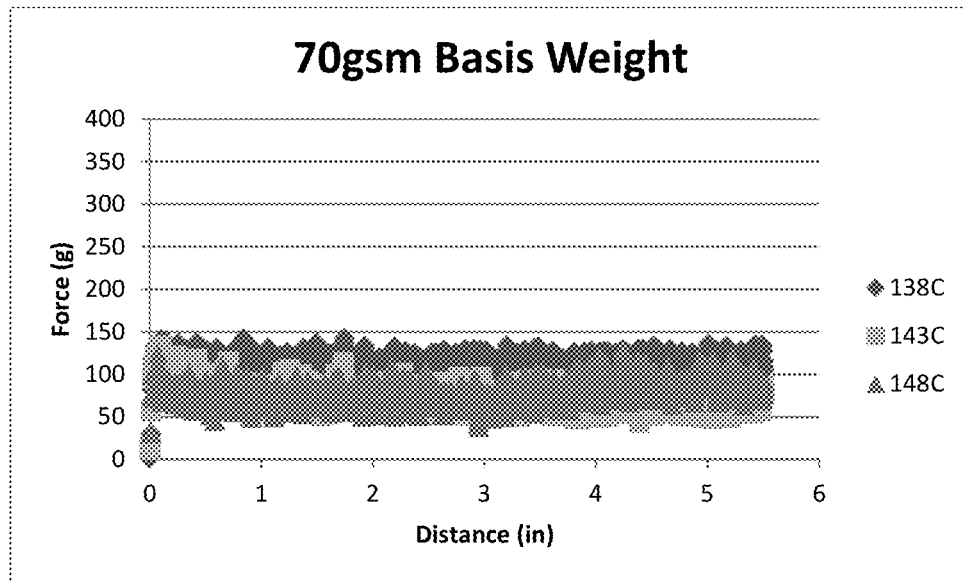
Figure 7D:
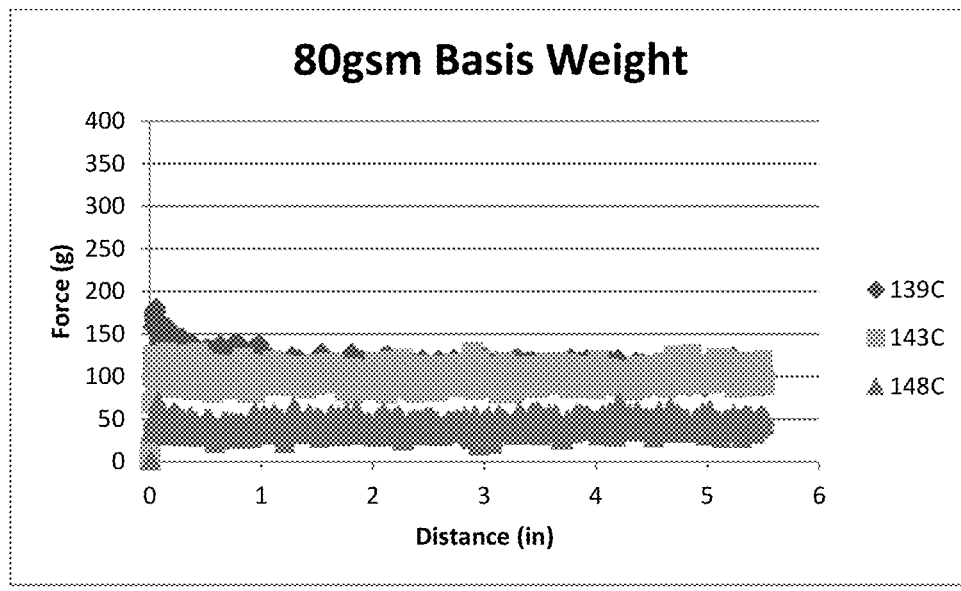

FIGS. 7A-7D provide illustrations of the friction profiles of the nonwoven materials of Example 3. The friction profiles correspond to the force necessary to move the material across a surface for a certain distance at a constant speed. Each of the Figures provides friction profiles for nonwoven materials which were stabilized at three different temperatures. FIG. 7A provides the friction profiles of 50 gsm nonwoven materials. FIG. 7B provides the friction profiles of 60 gsm nonwoven materials. FIG. 7C provides the friction profiles of 70 gsm nonwoven materials. FIG. 7D provides the friction profiles of 80 gsm nonwoven materials.

Figure 8A:
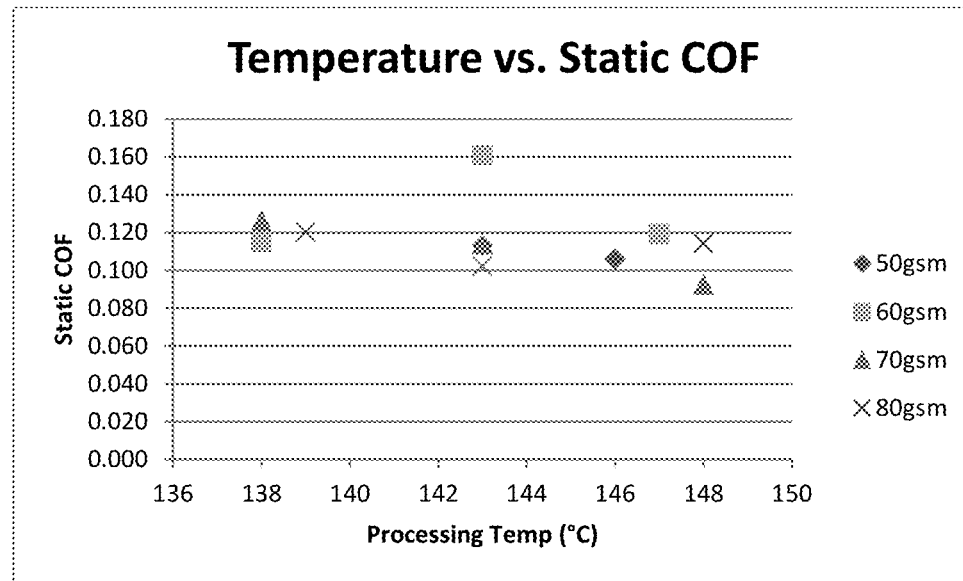
Figure 8B:
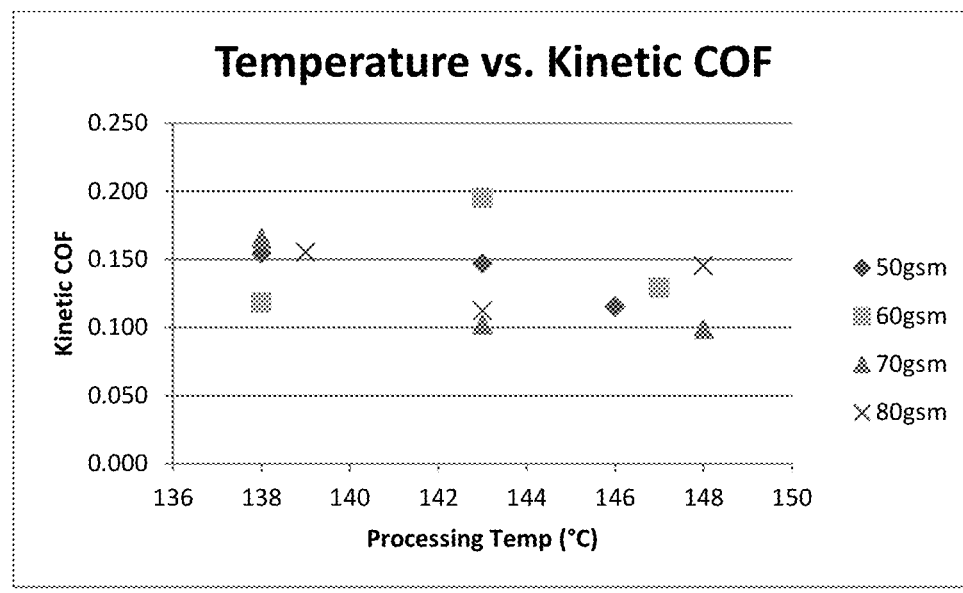

FIGS. 8A-8B provide illustrations of the coefficients of friction of the nonwoven materials of Example 3 when rubbed on a black glass surface. The nonwoven materials were stabilized at temperatures from 138° C. to 148° C. and had basis weights of 50 gsm, 60 gsm, 70 gsm, and 80 gsm. FIG. 8A provides the static coefficients of friction and FIG. 8B provides the kinetic coefficients of friction.

Figure 9A:
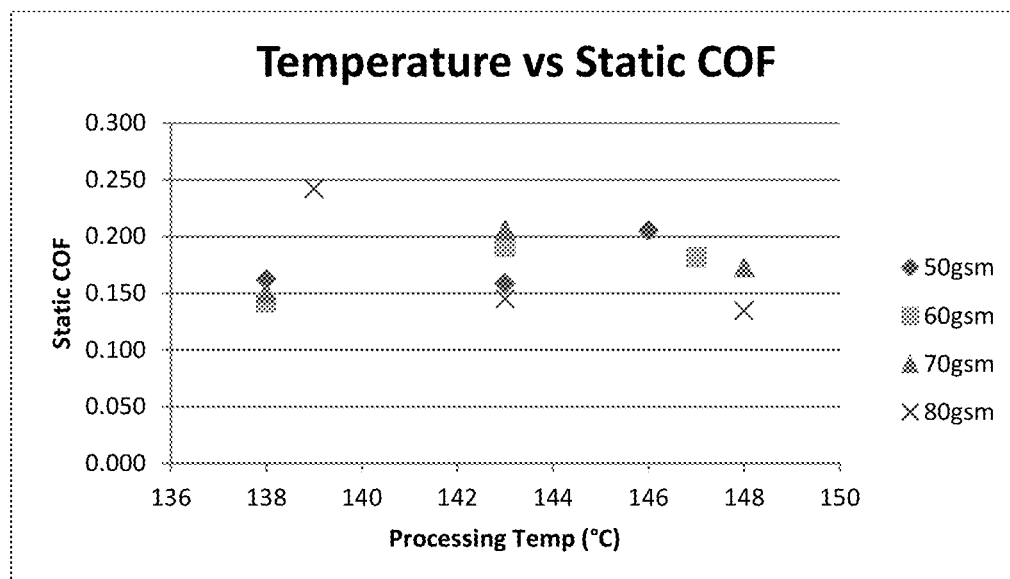
Figure 9B:
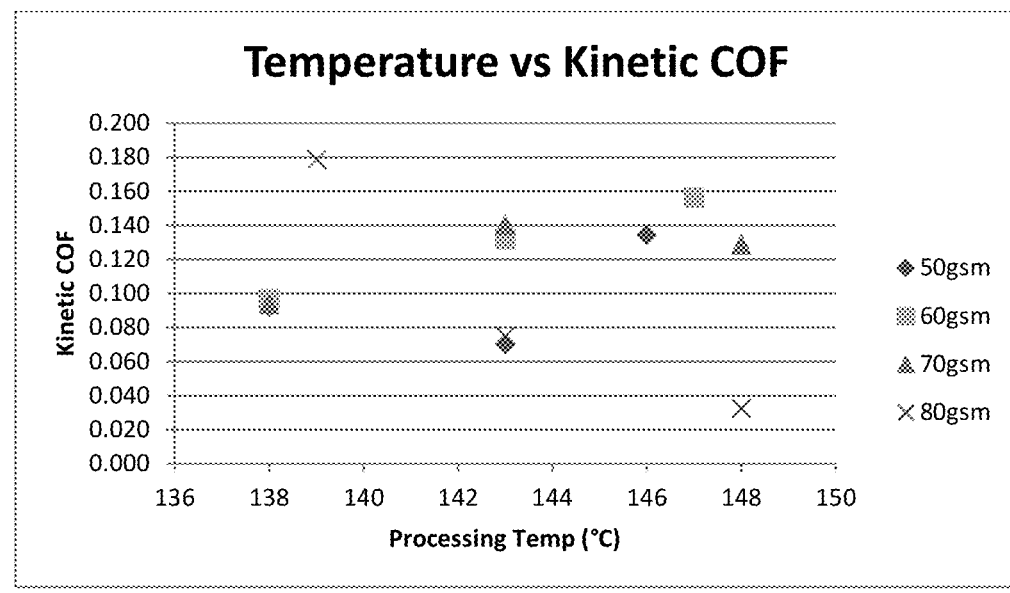

FIGS. 9A-9B provide illustrations of the coefficients of friction of the nonwoven materials of Example 3 when rubbed on a ceramic surface. The nonwoven materials were stabilized at temperatures from 138° C. to 148° C. and had basis weights of 50 gsm, 60 gsm, 70 gsm, and 80 gsm. FIG. 9A provides the static coefficients of friction and FIG. 9B provides the kinetic coefficients of friction.

Figure 10A:
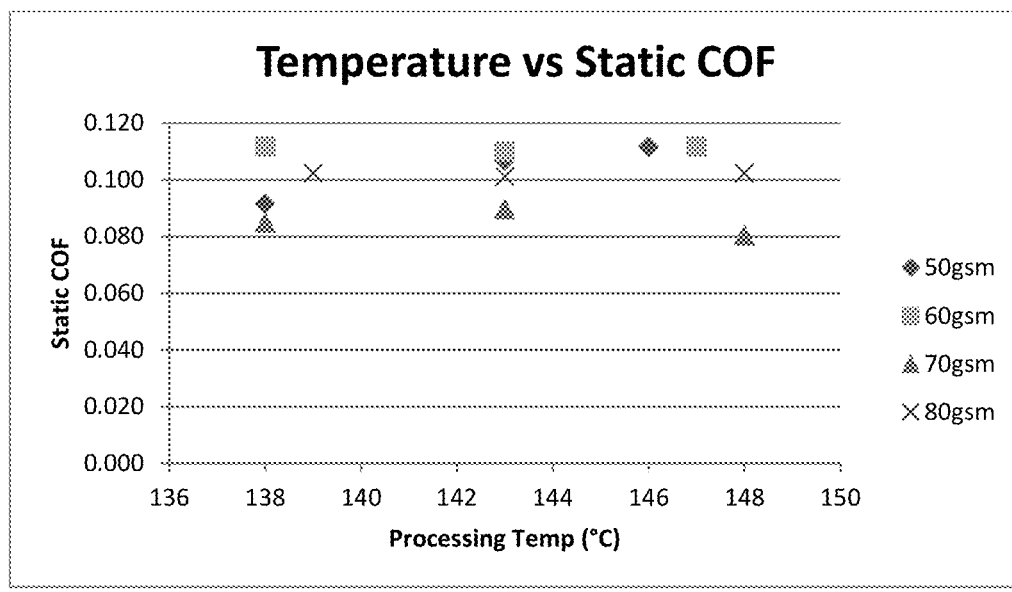
Figure 10B:
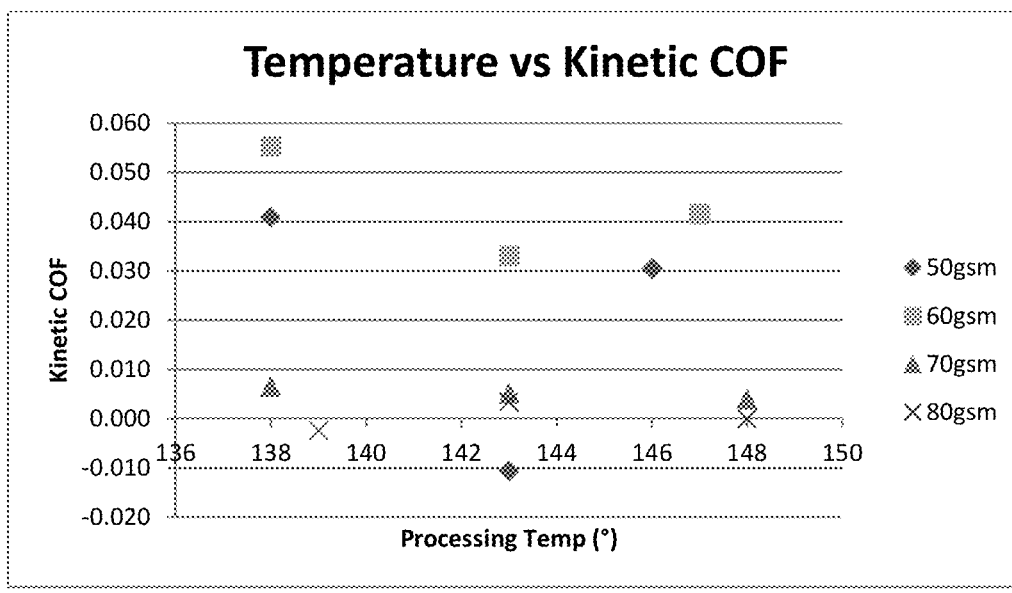

FIGS. 10A-10B provide illustrations of the coefficients of friction of the nonwoven materials of Example 3 when rubbed on a vinyl surface. The nonwoven materials were stabilized at temperatures from 138° C. to 148° C. and had basis weights of 50 gsm, 60 gsm, 70 gsm, and 80 gsm. FIG. 10A provides the static coefficients of friction and FIG. 10B provides the kinetic coefficients of friction.

Figure 11A:
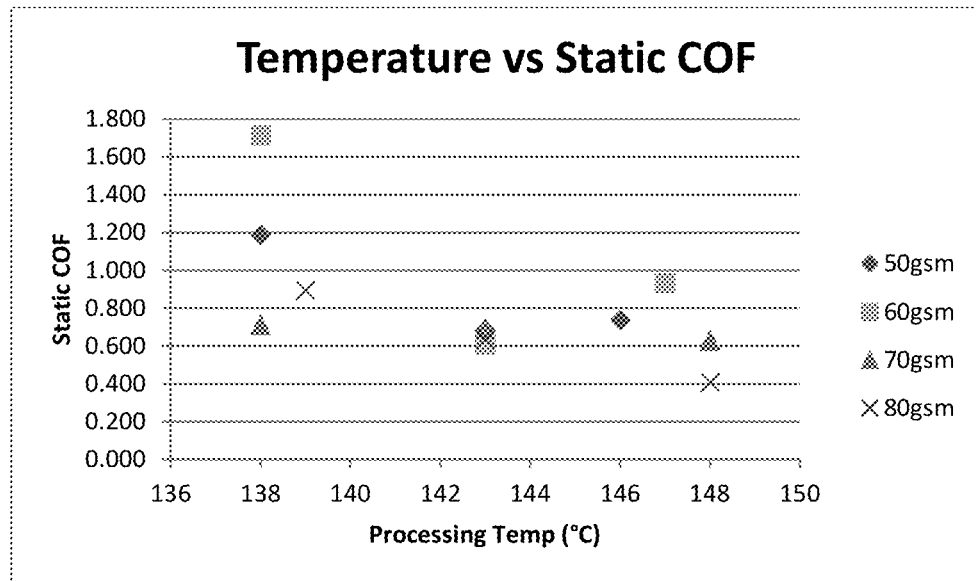
Figure 11B:
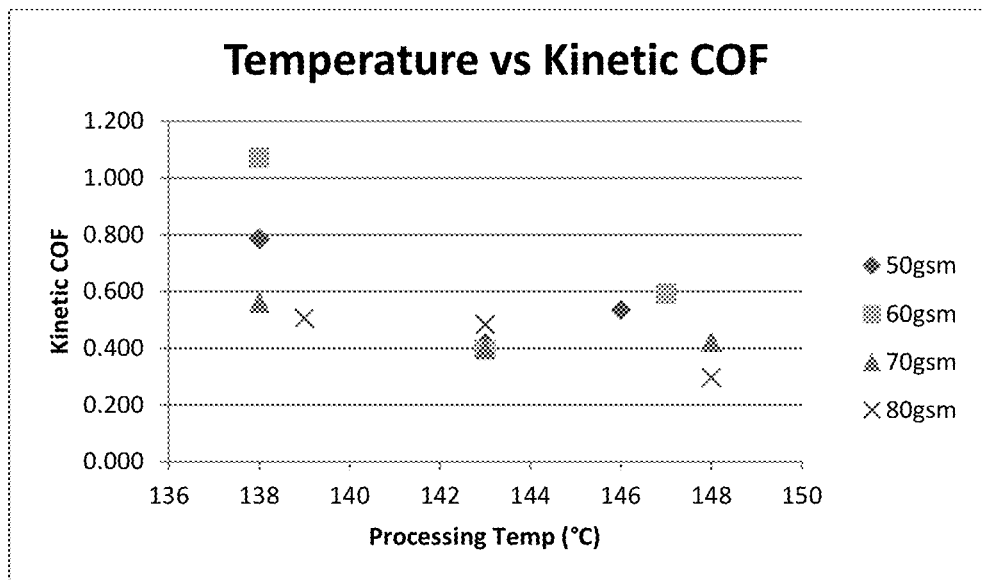

FIGS. 11A-11B provide illustrations of the coefficients of friction of the nonwoven materials of Example 3 when rubbed on their own surfaces. The nonwoven materials were stabilized at temperatures from 138° C. to 148° C. and had basis weights of 50 gsm, 60 gsm, 70 gsm, and 80 gsm. FIG. 11A provides the static coefficients of friction and FIG. 11B provides the kinetic coefficients of friction.

Figure 12:
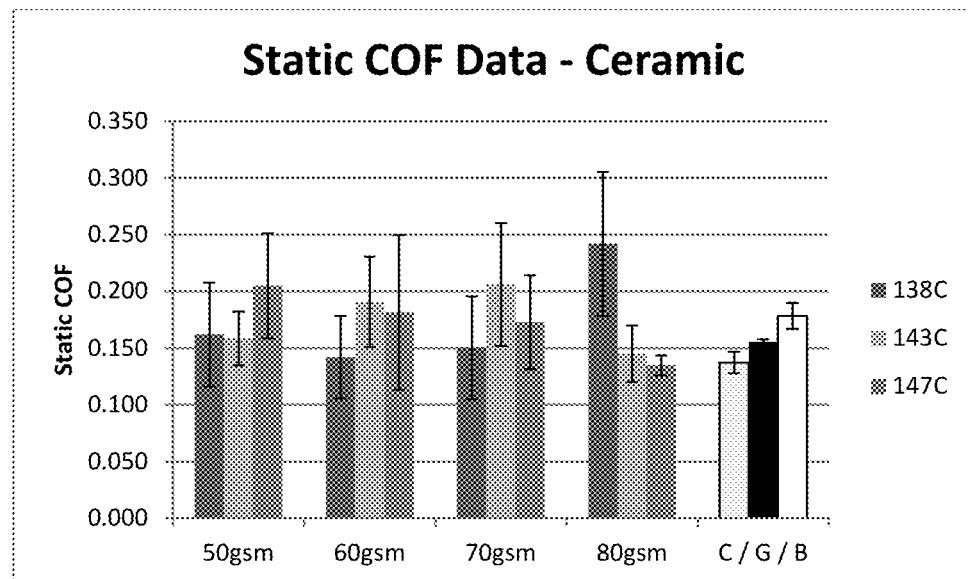

FIG. 12 provides an illustration of the static coefficients of friction of the nonwoven materials in Example 3 when rubbed on a ceramic surface compared to three commercially available materials. In FIG. 12, each bar corresponds to a material which was stabilized at a temperature of 138° C., 143° C., or 147° C. and which has a basis weight of 50 gsm, 60 gsm, 70 gsm, or 80 gsm. The static coefficients of friction of the commercially available materials (Clorox ("C"), Gojo ("G"), and Big Jobs ("B")) are also provided as bars in FIG. 12.

Figure 13:
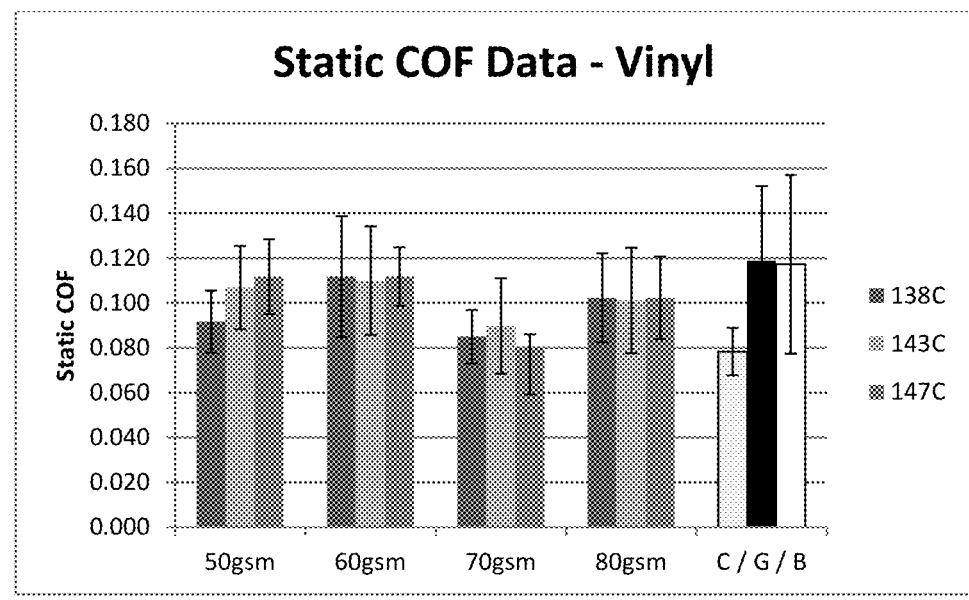

FIG. 13 provides an illustration of the static coefficients of friction of the nonwoven materials in Example 3 when rubbed on a vinyl surface compared to three commercially available materials. In FIG. 13, each bar corresponds to a material which was stabilized at a temperature of 138° C., 143° C., or 147° C. and which has a basis weight of 50 gsm, 60 gsm, 70 gsm, or 80 gsm. The static coefficients of friction of the commercially available materials (Clorox ("C"), Gojo ("G"), and Big Jobs ("B")) are also provided as bars in FIG. 13.

Figure 14:
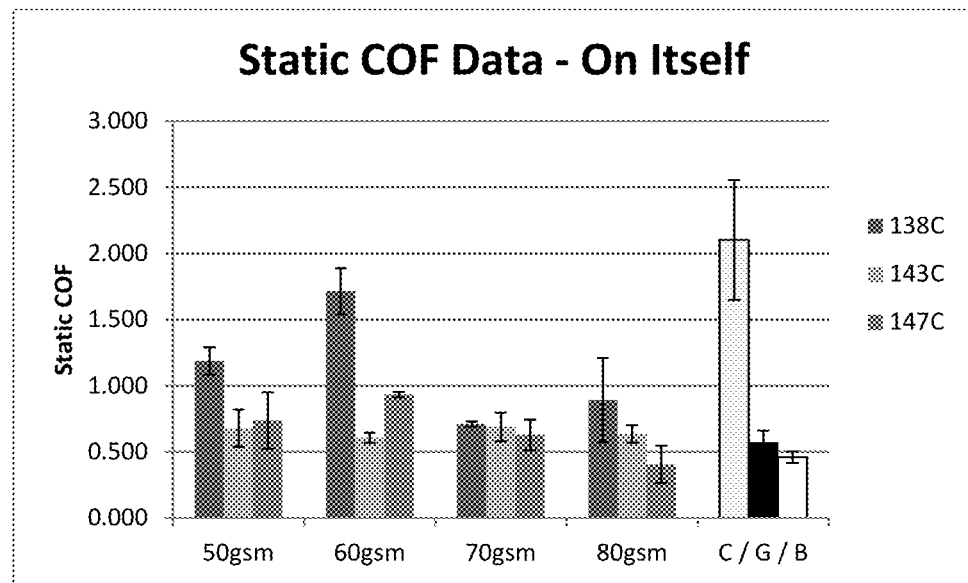

FIG. 14 provides an illustration of the static coefficients of friction of the nonwoven materials in Example 3 when rubbed on their own surfaces compared to three commercially available materials. In FIG. 14, each bar corresponds to a material which was stabilized at a temperature of 138° C., 143° C., or 147° C. and which has a basis weight of 50 gsm, 60 gsm, 70 gsm, or 80 gsm. The static coefficients of friction of the commercially available materials (Clorox ("C"), Gojo ("G"), and Big Jobs ("B")) are also provided for comparison.

Figure 15:
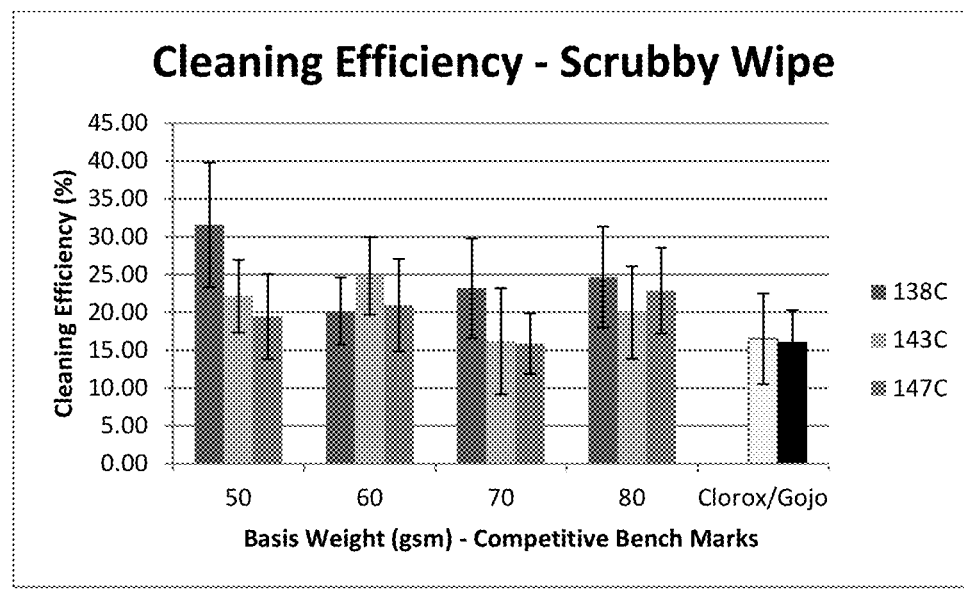

FIG. 15 provides an illustration of the cleaning efficiency of the nonwoven materials of Example 4, which were stabilized at various processing temperatures, as compared to two commercially available products. In FIG. 15, each bar corresponds to a material which was stabilized at a temperature of 138° C., 143° C., or 147° C. and which has a basis weight of 50 gsm, 60 gsm, 70 gsm, or 80 gsm. The cleaning efficiencies of the commercially available materials (Clorox and Gojo) are provided for comparison.

Figure 16:
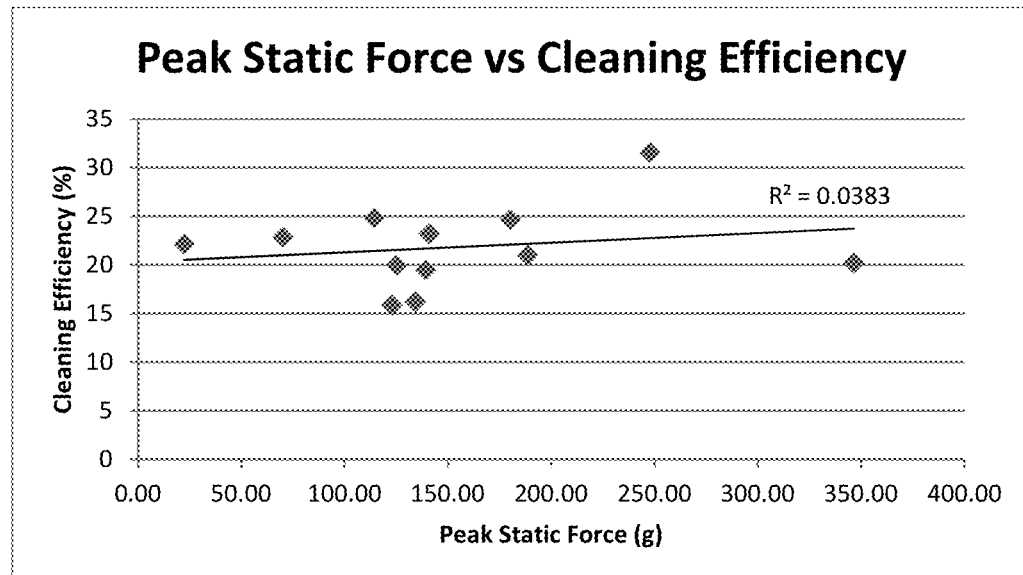

FIG. 16 provides a plot of peak static force versus cleaning efficiency for the nonwoven materials of Example 4. Each data point represents a different nonwoven material having a peak static force and a cleaning efficiency. FIG. 16 includes a trend line to show the relationship between peak static force and cleaning efficiency.

Figure 17:
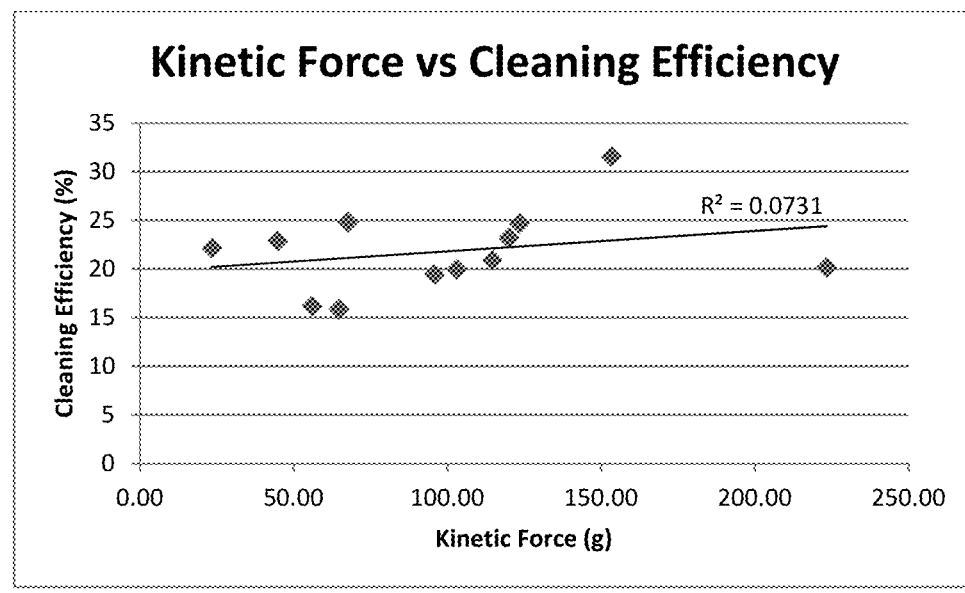

FIG. 17 provides a plot of kinetic force versus cleaning efficiency for the nonwoven materials of Example 4. Each data point represents a different nonwoven material having a kinetic force and a cleaning efficiency. FIG. 17 includes a trend line to show the relationship between kinetic force and cleaning efficiency.

6. DETAILED DESCRIPTION

The presently disclosed subject matter provides a nonwoven material having at least two layers, and including a rough outer surface. The presently disclosed subject matter also provides methods for making such materials. These and other aspects of the disclosed subject matter are discussed more in the detailed description and examples.

Definitions

The terms used in this specification generally have their ordinary meanings in the art, within the context of this subject matter and in the specific context where each term is used. Certain terms are defined below to provide additional guidance in describing the compositions and methods of the disclosed subject matter and how to make and use them.

As used herein, a "nonwoven" refers to a class of material, including but not limited to textiles or plastics. Nonwovens are sheet or web structures made of fiber, filaments, molten plastic, or plastic films bonded together mechanically, thermally, or chemically. A nonwoven is a fabric made directly from a web of fiber, without the yarn preparation necessary for weaving or knitting. In a nonwoven, the assembly of fibers is held together by one or more of the following: (1) by mechanical interlocking in a random web or mat; (2) by fusing of the fibers, as in the case of thermoplastic fibers; or (3) by bonding with a cementing medium such as a natural or synthetic resin.

As used herein, the term "weight percent" is meant to refer to either (i) the quantity by weight of a constituent/component in the material as a percentage of the weight of a layer of the material; or (ii) to the quantity by weight of a constituent/component in the material as a percentage of the weight of the final nonwoven material or product.

The term "basis weight" as used herein refers to the quantity by weight of a compound over a given area. Examples of the units of measure include grams per square meter as identified by the acronym "gsm".

As used herein, the term "cleaning efficiency" refers to the percentage of a mess removed by a material, when compared to the original amount of mess present. For example, cleaning efficiency can be calculated by determining the percentage of a known amount of mess that is picked up by a material upon cleaning the mess using the material.

As used herein, the term "coefficient of friction" refers to the ratio of the force of friction between two bodies and the normal force between the bodies. For example, and not limitation, the two bodies can be a nonwoven material and a surface. The "static coefficient of friction" refers to the coefficient of friction between two bodies that are not moving relative to each other. The "kinetic coefficient of friction" refers to the coefficient of friction between two bodies that are moving relative to each other. The static coefficient of friction and the kinetic coefficient of friction are both dimensionless values. A person having ordinary skill in the art will appreciate that the static coefficient of friction and the kinetic coefficient of friction are empirical measurements, and can be calculated experimentally for two bodies.

As used herein, the term "rough" or "roughness" refers to a textural quality of a nonwoven material. Rough can refer to the hand feel of a nonwoven material. Roughness can correspond to the harshness, rigidity, and/or abrasiveness of a nonwoven material.

As used in the specification and the appended claims, the singular forms "a," "an" and "the" include plural referents unless the context clearly dictates otherwise. Thus, for example, reference to "a compound" includes mixtures of compounds.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to systems or processes, the term can mean within an order of magnitude, preferably within 5-fold, and more preferably within 2-fold, of a value.

Fibers

The nonwoven material of the presently disclosed subject matter comprises one or more types of fibers. For example, the fibers can be natural, synthetic, or a mixture thereof. In certain embodiments, the nonwoven material can contain two or more layers, where each layer contains a specific fibrous content, which can include one or more of synthetic fibers, cellulose-based fibers, or a mixture thereof.

Synthetic Fibers

In certain embodiments, the nonwoven material can include one or more synthetic layers. Any synthetic fibers known in the art can be used in a synthetic layer. In one embodiment, the synthetic fibers comprise bicomponent and/or mono-component fibers. Bicomponent fibers having a core and sheath are known in the art. Many varieties are used in the manufacture of nonwoven materials, particularly those produced for use in airlaid techniques. Various bicomponent fibers suitable for use in the presently disclosed subject matter are disclosed in U.S. Pat. Nos. 5,372,885 and 5,456,982, both of which are hereby incorporated by reference in their entireties. Examples of bicomponent fiber manufacturers include, but are not limited to, Trevira (Bobingen, Germany), Fiber Innovation Technologies (Johnson City, Tenn.) and ES Fiber Visions (Athens, Ga.).

Bicomponent fibers can incorporate a variety of polymers as their core and sheath components. Bicomponent fibers that have a PE (polyethylene) or modified PE sheath typically have a PET (polyethylene terephthalate) or PP (polypropylene) core. In one embodiment, the bicomponent fiber has a core made of polyester and sheath made of polyethylene.

The denier of the bicomponent fiber preferably ranges from about 1.0 dpf to about 4.0 dpf, and more preferably from about 1.5 dpf to about 2.5 dpf. The length of the bicomponent fiber can be from about 3 mm to about 36 mm, preferably from about 3 mm to about 12 mm, more preferably from about 3 mm to about 10 mm. In particular embodiments, the length of the bicomponent fiber is from about 2 mm to about 8 mm, or about 4 mm, or about 6 mm.

Bicomponent fibers are typically fabricated commercially by melt spinning. In this procedure, each molten polymer is extruded through a die, for example, a spinneret, with subsequent pulling of the molten polymer to move it away from the face of the spinneret. This is followed by solidification of the polymer by heat transfer to a surrounding fluid medium, for example chilled air, and taking up of the now solid filament. Non-limiting examples of additional steps after melt spinning can also include hot or cold drawing, heat treating, crimping and cutting. This overall manufacturing process is generally carried out as a discontinuous two-step process that first involves spinning of the filaments and their collection into a tow that comprises numerous filaments. During the spinning step, when molten polymer is pulled away from the face of the spinneret, some drawing of the filament does occur which can also be called the drawdown. This is followed by a second step where the spun fibers are drawn or stretched to increase molecular alignment and crystallinity and to give enhanced strength and other physical properties to the individual filaments. Subsequent steps can include, but are not limited to, heat setting, crimping and cutting of the filament into fibers. The drawing or stretching step can involve drawing the core of the bicomponent fiber, the sheath of the bicomponent fiber or both the core and the sheath of the bicomponent fiber depending on the materials from which the core and sheath are comprised as well as the conditions employed during the drawing or stretching process.

Bicomponent fibers can also be formed in a continuous process where the spinning and drawing are done in a continuous process. During the fiber manufacturing process it is desirable to add various materials to the fiber after the melt spinning step at various subsequent steps in the process. These materials can be referred to as "finish" and be comprised of active agents such as, but not limited to, lubricants and anti-static agents. The finish is typically delivered via an aqueous based solution or emulsion. Finishes can provide desirable properties for both the manufacturing of the bicomponent fiber and for the user of the fiber, for example in an airlaid or wetlaid process.

Numerous other processes are involved before, during and after the spinning and drawing steps and are disclosed in U.S. Pat. Nos. 4,950,541, 5,082,899, 5,126,199, 5,372,885, 5,456,982, 5,705,565, 2,861,319, 2,931,091, 2,989,798, 3,038,235, 3,081,490, 3,117,362, 3,121,254, 3,188,689, 3,237,245, 3,249,669, 3,457,342, 3,466,703, 3,469,279, 3,500,498, 3,585,685, 3,163,170, 3,692,423, 3,716,317, 3,778,208, 3,787,162, 3,814,561, 3,963,406, 3,992,499, 4,052,146, 4,251,200, 4,350,006, 4,370,114, 4,406,850, 4,445,833, 4,717,325, 4,743,189, 5,162,074, 5,256,050, 5,505,889, 5,582,913, and 6,670,035, all of which are hereby incorporated by reference in their entireties.

The presently disclosed subject matter can also include, but are not limited to, articles that contain bicomponent fibers that are partially drawn with varying degrees of draw or stretch, highly drawn bicomponent fibers and mixtures thereof. These can include, but are not limited to, a highly drawn polyester core bicomponent fiber with a variety of sheath materials, specifically including a polyethylene sheath such as Trevira T255 (Bobingen, Germany) or a highly drawn polypropylene core bicomponent fiber with a variety of sheath materials, specifically including a polyethylene sheath such as ES FiberVisions AL-Adhesion-C (Varde, Denmark). Additionally, Trevira T265 bicomponent fiber (Bobingen, Germany), having a partially drawn core with a core made of polybutylene terephthalate (PBT) and a sheath made of polyethylene can be used. The use of both partially drawn and highly drawn bicomponent fibers in the same structure can be leveraged to meet specific physical and performance properties based on how they are incorporated into the structure.

The bicomponent fibers of the presently disclosed subject matter are not limited in scope to any specific polymers for either the core or the sheath as any partially drawn core bicomponent fiber can provide enhanced performance regarding elongation and strength. The degree to which the partially drawn bicomponent fibers are drawn is not limited in scope as different degrees of drawing will yield different enhancements in performance. The scope of the partially drawn bicomponent fibers encompasses fibers with various core sheath configurations including, but not limited to concentric, eccentric, side by side, islands in a sea, pie segments and other variations. The relative weight percentages of the core and sheath components of the total fiber can be varied. In addition, the scope of this subject matter covers the use of partially drawn homopolymers such as polyester, polypropylene, nylon, and other melt spinnable polymers. The scope of this subject matter also covers multicomponent fibers that can have more than two polymers as part of the fibers structure.

In particular embodiments, the bicomponent fibers in a particular layer comprise from about 10 to about 100 percent by weight of the layer. In alternative embodiments, the bicomponent layer contains from about 10 gsm to about 50 gsm bicomponent fibers, or from about 20 gsm to about 50 gsm bicomponent fibers, or from about 30 gsm to about 40 gsm bicomponent fibers.

In particular embodiments, the bicomponent fibers are low dtex staple bicomponent fibers in the range of about 0.5 dtex to about 20 dtex. In certain embodiments, the dtex value is 5.7 dtex. In other certain embodiments, the dtex value is 1.7 dtex.

Other synthetic fibers suitable for use in various embodiments as fibers or as bicomponent binder fibers include, but are not limited to, fibers made from various polymers including, by way of example and not by limitation, acrylic, polyamides (including, but not limited to, Nylon 6, Nylon 6/6, Nylon 12, polyaspartic acid, polyglutamic acid), polyamines, polyimides, polyacrylics (including, but not limited to, polyacrylamide, polyacrylonitrile, esters of methacrylic acid and acrylic acid), polycarbonates (including, but not limited to, polybisphenol A carbonate, polypropylene carbonate), polydienes (including, but not limited to, polybutadiene, polyisoprene, polynorbomene), polyepoxides, polyesters (including, but not limited to, polyethylene terephthalate, polybutylene terephthalate, polytrimethylene terephthalate, polycaprolactone, polyglycolide, polylactide, polyhydroxybutyrate, polyhydroxyvalerate, polyethylene adipate, polybutylene adipate, polypropylene succinate), polyethers (including, but not limited to, polyethylene glycol (polyethylene oxide), polybutylene glycol, polypropylene oxide, polyoxymethylene (paraformaldehyde), polytetramethylene ether (polytetrahydrofuran), polyepichlorohydrin), polyfluorocarbons, formaldehyde polymers (including, but not limited to, urea-formaldehyde, melamine-formaldehyde, phenol formaldehyde), natural polymers (including, but not limited to, cellulosics, chitosans, lignins, waxes), polyolefins (including, but not limited to, polyethylene, polypropylene, polybutylene, polybutene, polyoctene), polyphenylenes (including, but not limited to, polyphenylene oxide, polyphenylene sulfide, polyphenylene ether sulfone), silicon containing polymers (including, but not limited to, polydimethyl siloxane, polycarbomethyl silane), polyurethanes, polyvinyls (including, but not limited to, polyvinyl butyral, polyvinyl alcohol, esters and ethers of polyvinyl alcohol, polyvinyl acetate, polystyrene, polymethylstyrene, polyvinyl chloride, polyvinyl pyrrolidone, polymethyl vinyl ether, polyethyl vinyl ether, polyvinyl methyl ketone), polyacetals, polyarylates, and copolymers (including, but not limited to, polyethylene-co-vinyl acetate, polyethylene-co-acrylic acid, polybutylene terephthalate-co-polyethylene terephthalate, polylauryllactam-block-polytetrahydrofuran), polybutylene succinate and polylactic acid based polymers.

In particular embodiments, spunbond polypropylene fibers are used in a synthetic fiber layer. In certain embodiments, the synthetic fiber layer contains from about 5 gsm to about 20 gsm synthetic fibers, or about 10 gsm to about 15 gsm synthetic fibers.

Cellulose Fibers

In addition to the use of synthetic fibers, the presently disclosed subject matter also contemplates the use of cellulose-based fibers. In certain embodiments, the nonwoven material can include one or more cellulosic layers. Any cellulose fibers known in the art, including cellulose fibers of any natural origin, such as those derived from wood pulp or regenerated cellulose, can be used in a cellulosic layer. In certain embodiment, cellulose fibers include, but are not limited to, digested fibers, such as kraft, prehydrolyzed kraft, soda, sulfite, chemi-thermal mechanical, and thermo-mechanical treated fibers, derived from softwood, hardwood or cotton linters. In other embodiments, cellulose fibers include, but are not limited to, kraft digested fibers, including prehydrolyzed kraft digested fibers. Non-limiting examples of cellulosic fibers suitable for use in this subject matter are the cellulose fibers derived from softwoods, such as pines, firs, and spruces. Other suitable cellulose fibers include, but are not limited to, those derived from Esparto grass, bagasse, kemp, flax, hemp, kenaf, and other lignaceous and cellulosic fiber sources. Suitable cellulose fibers include, but are not limited to, bleached Kraft southern pine fibers sold under the trademark FOLEY FLUFFS® (Buckeye Technologies Inc., Memphis, Tenn.). Additionally, fibers sold under the trademark CELLU TISSUE® (e.g., Grade 3024) (Clearwater Paper Corporation, Spokane, Wash.) are utilized in certain aspects of the disclosed subject matter.

The nonwoven materials of the disclosed subject matter can also include, but are not limited to, a commercially available bright fluff pulp including, but not limited to, southern softwood fluff pulp (such as Treated FOLEY FLUFFS®) northern softwood sulfite pulp (such as T 730 from Weyerhaeuser), or hardwood pulp (such as eucalyptus). While certain pulps may be preferred based on a variety of factors, any absorbent fluff pulp or mixtures thereof can be used. In certain embodiments, wood cellulose, cotton linter pulp, chemically modified cellulose such as crosslinked cellulose fibers and highly purified cellulose fibers can be used. Non-limiting examples of additional pulps are FOLEY FLUFFS® FFTAS (also known as FFTAS or Buckeye Technologies FFT-AS pulp), and Weyco CF401.

Other suitable types of cellulose fiber include, but are not limited to, chemically modified cellulose fibers. In particular embodiments, the modified cellulose fibers are crosslinked cellulose fibers. U.S. Pat. Nos. 5,492,759; 5,601,921; 6,159,335, all of which are hereby incorporated by reference in their entireties, relate to chemically treated cellulose fibers useful in the practice of this disclosed subject matter. In certain embodiments, the modified cellulose fibers comprise a polyhydroxy compound. Non-limiting examples of polyhydroxy compounds include glycerol, trimethylolpropane, pentaerythritol, polyvinyl alcohol, partially hydrolyzed polyvinyl acetate, and fully hydrolyzed polyvinyl acetate. In certain embodiments, the fiber is treated with a polyvalent cation-containing compound. In one embodiment, the polyvalent cation-containing compound is present in an amount from about 0.1 weight percent to about 20 weight percent based on the dry weight of the untreated fiber. In particular embodiments, the polyvalent cation containing compound is a polyvalent metal ion salt. In certain embodiments, the polyvalent cation containing compound is selected from the group consisting of aluminum, iron, tin, salts thereof, and mixtures thereof. Any polyvalent metal salt including transition metal salts may be used. Non-limiting examples of suitable polyvalent metals include beryllium, magnesium, calcium, strontium, barium, titanium, zirconium, vanadium, chromium, molybdenum, tungsten, manganese, iron, cobalt, nickel, copper, zinc, aluminum and tin. Preferred ions include aluminum, iron and tin. The preferred metal ions have oxidation states of +3 or +4. Any salt containing the polyvalent metal ion may be employed. Non-limiting examples of suitable inorganic salts of the above metals include chlorides, nitrates, sulfates, borates, bromides, iodides, fluorides, nitrites, perchlorates, phosphates, hydroxides, sulfides, carbonates, bicarbonates, oxides, alkoxides phenoxides, phosphites, and hypophosphites. Non-limiting examples of suitable organic salts of the above metals include formates, acetates, butyrates, hexanoates, adipates, citrates, lactates, oxalates, propionates, salicylates, glycinates, tartrates, glycolates, sulfonates, phosphonates, glutamates, octanoates, benzoates, gluconates, maleates, succinates, and 4,5-dihydroxy-benzene-1,3-disulfonates. In addition to the polyvalent metal salts, other compounds such as complexes of the above salts include, but are not limited to, amines, ethylenediaminetetra-acetic acid (EDTA), diethylenetriaminepenta-acetic acid (DIPA), nitrilotri-acetic acid (NTA), 2,4-pentanedione, and ammonia may be used.

In one embodiment, the cellulose pulp fibers are chemically modified cellulose pulp fibers that have been softened or plasticized to be inherently more compressible than unmodified pulp fibers. The same pressure applied to a plasticized pulp web will result in higher density than when applied to an unmodified pulp web. Additionally, the densified web of plasticized cellulose fibers is inherently softer than a similar density web of unmodified fiber of the same wood type. Softwood pulps may be made more compressible using cationic surfactants as debonders to disrupt interfiber associations. Use of one or more debonders facilitates the disintegration of the pulp sheet into fluff in the airlaid process. Examples of debonders include, but are not limited to, those disclosed in U.S. Pat. Nos. 4,432,833, 4,425,186 and 5,776,308, all of which are hereby incorporated by reference in their entireties. One example of a debonder-treated cellulose pulp is FFLE+. Plasticizers for cellulose, which can be added to a pulp slurry prior to forming wetlaid sheets, can also be used to soften pulp, although they act by a different mechanism than debonding agents. Plasticizing agents act within the fiber, at the cellulose molecule, to make flexible or soften amorphous regions. The resulting fibers are characterized as limp. Since the plasticized fibers lack stiffness, the comminuted pulp is easier to densify compared to fibers not treated with plasticizers. Plasticizers include, but are not limited to, polyhydric alcohols such as glycerol, low molecular weight polyglycol such as polyethylene glycols, and polyhydroxy compounds. These and other plasticizers are described and exemplified in U.S. Pat. Nos. 4,098,996, 5,547,541 and 4,731,269, all of which are hereby incorporated by reference in their entireties. Ammonia, urea, and alkylamines are also known to plasticize wood products, which mainly contain cellulose (A. J. Stamm, Forest Products Journal 5(6):413, 1955, hereby incorporated by reference in its entirety).

In particular embodiments of the disclosed subject matter, GP4723, a fully treated cellulose pulp (available from Georgia-Pacific) is used in a cellulose fiber layer. In particular embodiments, the cellulose fiber layer contains from about 5 gsm to about 100 gsm cellulose fibers, or from about 7 gsm to about 50 gsm, or about 9 gsm to about 30 gsm.

Binders and Other Additives

Suitable binders include, but are not limited to, liquid binders and powder binders. Non-limiting examples of liquid binders include emulsions, solutions, or suspensions of binders. Non-limiting examples of binders include polyethylene powders, copolymer binders, vinylacetate ethylene binders, styrene-butadiene binders, urethanes, urethane-based binders, acrylic binders, thermoplastic binders, natural polymer based binders, and mixtures thereof.

Suitable binders include, but are not limited to, copolymers, vinylacetate ethylene ("VAE") copolymers which can have a stabilizer, such as Wacker Vinnapas 192, Wacker Vinnapas EF 539, Wacker Vinnapas EP907, Wacker Vinnapas EP129, Celanese Duroset E130, Celanese Dur-O-Set Elite 130 25-1813 and Celanese Dur-O-Set TX-849, Celanese 75-524A, polyvinyl alcohol-polyvinyl acetate blends such as Wacker Vinac 911, vinyl acetate homopolymers, polyvinyl amines such as BASF Luredur, acrylics, cationic acrylamides, polyacryliamides such as Bercon Berstrength 5040 and Bercon Berstrength 5150, hydroxyethyl cellulose, starch such as National Starch CATO® 232, National Starch CATO® 255, National Starch Optibond, National Starch Optipro, or National Starch OptiPLUS, guar gum, styrene-butadienes, urethanes, urethane-based binders, thermoplastic binders, acrylic binders, and carboxymethyl cellulose such as Hercules Aqualon CMC. In certain embodiments, the binder is a natural polymer based binder. Non-limiting examples of natural polymer based binders include polymers derived from starch, cellulose, chitin, and other polysaccharides.

In certain embodiments, the binder is water-soluble. In one embodiment, the binder is a vinylacetate ethylene copolymer. One non-limiting example of such copolymers is EP907 (Wacker Chemicals, Munich, Germany). Vinnapas EP907 can be applied at a level of about 10% solids incorporating about 0.75% by weight Aerosol OT (Cytec Industries, West Paterson, N.J.), which is an anionic surfactant. Other classes of liquid binders such as styrene-butadiene and acrylic binders can also be used.

In certain embodiments, the binder is not water-soluble. Examples of these binders include, but are not limited to, Vinnapas 124 and 192 (Wacker) which can have an opacifier and whitener, including, but not limited to, titanium dioxide, dispersed in the emulsion. Other binders include, but are not limited to, Celanese Emulsions (Bridgewater, N.J.) Elite 22 and Elite 33.

In certain embodiments, the binder is a thermoplastic binder. Such thermoplastic binders include, but are not limited to, any thermoplastic polymer which can be melted at temperatures which will not extensively damage the cellulosic fibers. Preferably, the melting point of the thermoplastic binding material will be less than about 175° C. Examples of suitable thermoplastic materials include, but are not limited to, suspensions of thermoplastic binders and thermoplastic powders. In particular embodiments, the thermoplastic binding material can be, for example, polyethylene, polypropylene, polyvinylchloride, and/or polyvinylidene chloride.

In particular embodiments, the vinylacetate ethylene binder is non-crosslinkable. In one embodiment, the vinylacetate ethylene binder is crosslinkable. In certain embodiments, the binder is WD4047 urethane-based binder solution supplied by HB Fuller. In one embodiment, the binder is Michem Prime 4983-45N dispersion of ethylene acrylic acid ("EAA") copolymer supplied by Michelman. In certain embodiments, the binder is Dur-O-Set Elite 22LV emulsion of VAE binder supplied by Celanese Emulsions (Bridgewater, N.J.). As noted above, in particular embodiments, the binder is crosslinkable. It is also understood that crosslinkable binders are also known as permanent wet strength binders. A permanent wet-strength binder includes, but is not limited to, Kymene® (Hercules Inc., Wilmington, Del.), Parez® (American Cyanamid Company, Wayne, N.J.), Wacker Vinnapas or AF192 (Wacker Chemie AG, Munich, Germany), or the like. Various permanent wet-strength agents are described in U.S. Pat. Nos. 2,345,543, 2,926,116, and 2,926,154, the disclosures of which are incorporated by reference in their entirety. Other permanent wet-strength binders include, but are not limited to, polyamine-epichlorohydrin, polyamide epichlorohydrin or polyamide-amine epichlorohydrin resins, which are collectively termed "PAE resins". Non-limiting exemplary permanent wet-strength binders include Kymene 557H or Kymene 557LX (Hercules Inc., Wilmington, Del.) and have been described in U.S. Pat. Nos. 3,700,623 and 3,772,076, which are incorporated herein in their entirety by reference thereto.

Alternatively, in certain embodiments, the binder is a temporary wet-strength binder. The temporary wet-strength binders include, but are not limited to, Hercobond® (Hercules Inc., Wilmington, Del.), Parez® 750 (American Cyanamid Company, Wayne, N.J.), Parez® 745 (American Cyanamid Company, Wayne, N.J.), or the like. Other suitable temporary wet-strength binders include, but are not limited to, dialdehyde starch, polyethylene imine, mannogalactan gum, glyoxal, and dialdehyde mannogalactan. Other suitable temporary wet-strength agents are described in U.S. Pat. Nos. 3,556,932, 5,466,337, 3,556,933, 4,605,702, 4,603,176, 5,935,383, and 6,017,417, all of which are incorporated herein in their entirety by reference thereto.

In certain embodiments, binders are applied as emulsions in amounts ranging from about 1 gsm to about 4 gsm, or from about 1 gsm to about 2 gsm, or from about 2 gsm to about 3 gsm. Binder can be applied to one side of a fibrous layer, preferably an externally facing layer. Alternatively, binder can be applied to both sides of a layer, in equal or disproportionate amounts.

In certain embodiments, the nonwoven material can further contain other additives. For example, in certain embodiments, the nonwoven material can contain a lotion, sanitizer, or disinfectant.

Nonwoven Materials

The presently disclosed subject matter provides for nonwoven materials having at least one outer layer with a rough surface. In certain embodiments, a nonwoven material contains at least two layers, wherein each layer comprises a specific fibrous content. In specific embodiments, the nonwoven material contains a synthetic fiber layer and a cellulose fiber layer. In other embodiments, the nonwoven material contains at least two synthetic fiber layers. In particular embodiments, a synthetic fiber layer can include bicomponent fibers.

In certain embodiments, the nonwoven material has at least two layers, wherein each layer comprises a specific fibrous content. In specific embodiments, the nonwoven material contains a bicomponent fiber layer and a synthetic fiber layer. In certain embodiments, one or more layers are bonded on at least a portion of at least one of their outer surfaces with binder. It is not necessary that the binder chemically bond with a portion of the layer, although it is preferred that the binder remain associated in close proximity with the layer, by coating, adhering, precipitation, or any other mechanism such that it is not dislodged from the layer during normal handling of the layer. For convenience, the association between the layer and the binder discussed above can be referred to as the bond, and the compound can be said to be bonded to the layer.

In a particular embodiment, the first layer is composed of bicomponent fibers. A second layer disposed adjacent to the first layer is composed of synthetic fibers. In an alternative embodiment, the second layer is composed of cellulose fibers. In certain embodiments, the second layer is composed of both cellulose and synthetic fibers. In certain embodiments, the second layer is coated with binder on its outer surface.

In certain embodiments, the first layer contains from about 10 gsm to about 50 gsm of bicomponent fibers. In certain embodiments, the second layer contains from about 5 gsm to about 15 gsm of synthetic fibers. In particular embodiments, the synthetic fibers can include polypropylene. Additionally or alternatively, the second layer can contain from about 10 gsm to about 100 gsm of cellulose fibers.

In another embodiment, the nonwoven material has at least three layers, wherein each layer has a specific fibrous content. In certain embodiments, the first layer contains synthetic fibers. In certain embodiments, the synthetic fibers can be bicomponent fibers. A second layer disposed adjacent to the first layer contains synthetic fibers. A third layer disposed adjacent to the second layer may contain cellulose fibers or synthetic fibers. Optionally, additional layers may contain cellulose fibers or synthetic fibers.

In an alternative embodiment, the first layer contains bicomponent fibers. A second layer disposed adjacent to the first layer contains cellulose fibers. A third layer disposed adjacent to the second layer contains bicomponent fibers. The bicomponent fibers of the first layer and/or third layer can have specific dtex values. In certain embodiments, the first layer can contain bicomponent fibers having a higher dtex value than the bicomponent fibers of the third layer.

In a specific embodiment, the first layer comprises from about 10 gsm to about 50 gsm, or from about 20 gsm to about 50 gsm, or from about 25 gsm to about 40 gsm of bicomponent fibers. In certain embodiments, the bicomponent fibers have an eccentric core sheath configuration. In a specific embodiment, the second layer comprises from about 5 gsm to about 10 gsm bicomponent fibers and/or from about 9 gsm to about 30 gsm, or from about 20 gsm to about 25 gsm cellulose fibers. In another specific embodiment, the second layer comprises from about 5 gsm to about 20 gsm, or from about 10 gsm to about 15 gsm synthetic fibers. In a particular embodiment, the synthetic fibers comprise polypropylene.

In certain embodiments, the nonwoven material has at least four layers, wherein each layer has a specific fibrous content. In certain embodiments, the first layer contains synthetic fibers. The synthetic fibers can be bicomponent fibers. A second layer disposed adjacent to the first layer contains bicomponent fibers. A third layer disposed adjacent to the second layer contains cellulose fibers. A fourth layer disposed adjacent to the third layer contains synthetic fibers. In certain embodiments, the synthetic fibers can be bicomponent fibers. In particular embodiments, the first layer can contain bicomponent fibers having a higher dtex value than the bicomponent fibers of the fourth layer. The first layer and/or fourth layer can be coated with binder. In certain embodiments, the nonwoven material can include an additional layer disposed between the third and fourth layer and containing bicomponent fibers.

In certain embodiments of the presently disclosed subject matter, at least a portion of at least one outer layer is coated with binder. In particular embodiments of the disclosed subject matter, at least a portion of an outer layer is coated with binder in an amount ranging from about 1 gsm to about 4 gsm, or from about 1 gsm to about 2 gsm, or from about 2 gsm to about 3 gsm.

In certain embodiments of the nonwoven material, the range of the basis weight in a first layer is from about 5 gsm to about 100 gsm, or from about 5 gsm to about 50 gsm, or from about 20 gsm to about 40 gsm. The range of the basis weight in a second layer is from about 5 gsm to about 100 gsm, or from about 5 gsm to about 50 gsm, or from about 10 gsm to about 40 gsm. If additional layers are present, the basis weight of each ranges from about 5 gsm to about 100 gsm, or from about 5 gsm to about 50 gsm, or from about 10 gsm to about 40 gsm.

In certain embodiments of the nonwoven material, the range of basis weight of the overall structure is from about 5 gsm to about 300 gsm, or from about 5 gsm to about 250 gsm, or from about 10 gsm to about 250 gsm, or from about 20 gsm to about 200 gsm, or from about 30 gsm to about 200 gsm, or from about 40 gsm to about 200 gsm. In particular embodiments, the basis weight of the overall structure is about 50 gsm, about 60 gsm, about 70 gsm, or about 80 gsm.

The caliper of the nonwoven material refers to the caliper of the entire material. In certain embodiments, the caliper of the material ranges from about 0.5 to about 4.0 mm, or from about 0.5 to about 3.0 mm, or from about 0.5 to about 2.0 mm, or from about 0.7 mm to about 1.5 mm.

The presently disclosed subject matter provides for improved nonwoven materials with many advantages over various commercially available materials. The presently disclosed materials have at least one outer layer that forms a rough surface that is suited to cleaning applications. In certain embodiments, the cleaning efficiency of the nonwoven materials can be analyzed by determining the percentage of a mess that is cleaned using the nonwoven materials. In certain embodiments, the nonwoven materials can have a cleaning efficiency that is greater than 15%, greater than 18%, greater than 20%, greater than 25%, greater than 30%, greater than 31%, or greater than 35%.

Features of the Rough Outer Surface

The nonwoven material includes a rough outer surface created by heating an outer layer of the nonwoven material. In certain embodiments, the basis weight of the outer layer is from about 5 gsm to about 50 gsm, or from about 10 gsm to about 40 gsm.

In certain embodiments, the outer layer comprises synthetic fibers. In certain embodiments, the synthetic fibers are bicomponent fibers. In particular embodiments, the bicomponent fibers are partially drawn with eccentric core sheath configuration. In certain other embodiments, bicomponent fibers may be combined with other synthetic fibers and/or cellulose fibers. A person having ordinary skill in the art will appreciate that choice of fiber for the outer layer can contribute to the roughness of the outer layer. For example, the type of fiber and its dtex value, thickness, and stiffness can be selected to moderate the roughness of the outer layer. Additionally, blends of multiple different types of fibers can be used to moderate the roughness of the outer layer.

In particular embodiments, at least a portion of the outer layer is coated with a binder on its outer surface. The outer layer can be coated with a binder in amounts ranging from 1 to about 4 gsm, or from about 1 to about 2 gsm, or from about 2 to about 3 gsm.

The outer surface is heated at a controlled temperature such that it crimps. In certain embodiments, the controlled temperature ranges from about 110° C. to about 200° C. In preferred embodiments, the controlled temperature ranges from about 135° C. to about 150° C.

After cooling, the outer surface feels rougher compared to materials heated to lower temperatures. For example, the crimping of the outer surface can create ridges on the outer surface to increase its roughness.

The roughness of the outer surface can be approximated by the static and kinetic coefficients of friction of the nonwoven material with the rough outer surface. In certain embodiments, the nonwoven material can have a static coefficient of friction ranging from about 0.01 to about 3, or from about 0.05 to about 2, or from about 0.08 to about 1.8, or from about 0.12 to about 1.5, or from about 0.13 to about 1, or from about 0.17 to about 0.8, or from about 0.20 to about 0.5, or from about 0.25 to about 0.4. In certain embodiments, the nonwoven material can have a kinetic coefficient of friction ranging from about 0.0001 to about 2.0, or from about 0.001 to about 1.5, or from about 0.01 to about 1.2, or from about 0.02 to about 1, or from about 0.05 to about 0.8, or from about 0.10 to about 0.50, or from about 0.15 to about 0.20. In certain embodiments, the static and kinetic coefficients of friction can be determined by measuring the amount of force necessary to rub the nonwoven material across a surface. A person having ordinary skill in the art will appreciate that the static and kinetic coefficients of friction can vary depending on the surface used to measure the coefficients of friction. For example, the methods described in Example 3 can be used to measure the coefficients of friction.

The surface opposite the rough outer surface may have diverse qualities. In certain embodiments, it may be rough to provide a second rough surface for scrubbing applications. For example, the opposite surface may also be heated at a controlled temperature such that it crimps. Where both outer surfaces are heated to create two rough surfaces, the heat can be controlled such that one surface crimps more than the other, to create a nonwoven material having two surfaces of different roughness. Additionally or alternatively, the two outer surfaces may be composed of the same or different fibers to further moderate their relative roughness. In other certain embodiments, the opposite surface may be softer and suitable for wiping surfaces or collecting and absorbing particles.

The rough outer surface is suitable for a broad range of cleaning applications where a rough nonwoven material is desirable to scrub or wipe a surface.

Methods of Making the Materials

A variety of processes can be used to assemble the materials used in the practice of this disclosed subject matter to produce the materials, including but not limited to, traditional dry forming processes such as airlaying and carding or other forming technologies such as spunlace or airlace. Preferably, the materials can be prepared by airlaid processes. Airlaid processes include, but are not limited to, the use of one or more forming heads to deposit raw materials of differing compositions in selected order in the manufacturing process to produce a product with distinct strata. This allows great versatility in the variety of products which can be produced.

In one embodiment, the material is prepared as a continuous airlaid web. The airlaid web is typically prepared by disintegrating or defiberizing a cellulose pulp sheet or sheets, typically by hammermill, to provide individualized fibers. Rather than a pulp sheet of virgin fiber, the hammermills or other disintegrators can be fed with recycled airlaid edge trimmings and off-specification transitional material produced during grade changes and other airlaid production waste. Being able to thereby recycle production waste would contribute to improved economics for the overall process. The individualized fibers from whichever source, virgin or recycled, are then air conveyed to forming heads on the airlaid web-forming machine. A number of manufacturers make airlaid web forming machines suitable for use in the disclosed subject matter, including Dan-Web Forming of Aarhus, Denmark, M&J Fibretech A/S of Horsens, Denmark, Rando Machine Corporation, Macedon, N.Y. which is described in U.S. Pat. No. 3,972,092, which is incorporated herein in its entirety by reference thereto. Margasa Textile Machinery of Cerdanyola del Valles, Spain, and DOA International of Wels, Austria. While these many forming machines differ in how the fiber is opened and air-conveyed to the forming wire, they all are capable of producing the webs of the presently disclosed subject matter. The Dan-Web forming heads include rotating or agitated perforated drums, which serve to maintain fiber separation until the fibers are pulled by vacuum onto a foraminous forming conveyor or forming wire. In the M&J machine, the forming head is basically a rotary agitator above a screen. The rotary agitator may comprise a series or cluster of rotating propellers or fan blades. Other fibers, such as a synthetic thermoplastic fiber, are opened, weighed, and mixed in a fiber dosing system such as a textile feeder supplied by Laroche S. A. of Cours-La Ville, France. From the textile feeder, the fibers are air conveyed to the forming heads of the airlaid machine where they are further mixed with the comminuted cellulose pulp fibers from the hammer mills and deposited on the continuously moving forming wire. Where defined layers are desired, separate forming heads may be used for each type of fiber.

The airlaid web is transferred from the forming wire to a calendar or other densification stage to densify the web, if necessary, to increase its strength and control web thickness. In one embodiment, the fibers of the web are then bonded by passage through an oven set to a temperature high enough to fuse the included thermoplastic or other binder materials. The temperature of the oven during this stabilization step may be controlled to produce the rough outer surface. In certain embodiments, the temperature of stabilization is from about 110° C. to about 200° C. In other certain embodiments, the roughness of the outer layer may be formed by reheating the nonwoven material after it has been formed and stabilized.

In a further embodiment, secondary binding from the drying or curing of a latex spray or foam application occurs in the same oven. The oven can be a conventional through-air oven, be operated as a convection oven, or may achieve the necessary heating by infrared or even microwave irradiation. In particular embodiments, the airlaid web can be treated with additional additives before or after heat curing.

7. EXAMPLES

The following examples are merely illustrative of the presently disclosed subject matter and they should not be considered as limiting the scope of the subject matter in any way.

Example 1: Two-Layer Nonwoven Material

The present Example provides a two-layer nonwoven material in accordance with the disclosed subject matter.

The material was formed using a pilot-scale drum-forming machine. The top layer of the two-layer nonwoven material was composed of 30 gsm of bicomponent fibers (5.7 dtex, 4 mm, from FiberVision). The bottom layer was composed of 7.2 gsm of regular bicomponent fibers (Trevira Type 257, 1.7 dtex, 6 mm) mixed with 21.6 gsm of cellulose (GP 4723, fully treated pulp from Georgia-Pacific Leaf River). This layer was bonded by spraying a polymeric binder in the form of emulsion (Vinnapas 192, from Wacker) in an amount of 1.25 gsm based on dry weight. FIG. 1 gives a pictorial description of the two-sided nonwoven material composition.

The surface topography and rigidity were controlled by the temperature at which the nonwoven material was stabilized. In general, at higher temperatures yielded products with harsher hand feel.

Example 2: Two-Layer Nonwoven Material

The present Example provides a two-layer nonwoven material in accordance with the disclosed subject matter.

The material was formed using a pilot-scale drum-forming machine. The top layer of the two-layer nonwoven material was composed of 38 gsm of bicomponent fibers (FiberVision, 5.7 dtex, 4 mm). The bottom layer was composed of a 12 gsm untreated, polypropylene spunbond nonwoven (code=MOR-B0137) supplied by Polymer Group Inc. FIG. 2 gives a pictorial description of the two-sided nonwoven material composition. Three samples of the same material were prepared: Sample A, Sample B, and Sample C.

The surface topography and rigidity were controlled by the temperature at which the nonwoven material was stabilized. Sample A was stabilized at 135° C. Sample B was stabilized at 138° C. Sample C was stabilized at 149° C.

In general, higher temperatures yielded products with harsher hand feel. FIGS. 3 and 4 are photographs of the rough outer surfaces of Samples A, B and C. The photograph in FIG. 3 shows the samples without any additional treatment whereas the photograph in FIG. 4 shows the same samples after applying a dye.

FIG. 5 shows the microphotographs of the rough outer surfaces of Samples A, B and C. These microphotographs illustrate the various structures of fibrous networks in these samples created as a result of applying different temperatures at which these materials were stabilized.

FIG. 6 shows the microphotographs of the cross-sections of Samples A, B and C. These microphotographs illustrate the various structures of fibrous networks in these samples created as a result of applying different temperatures at which these materials were stabilized.

Example 3: Coefficients of Friction of Rough Nonwoven Materials

The present Example provides the static and kinetic coefficients of friction of nonwoven materials whose surface topography and rigidity were stabilized at various processing temperatures. The static and kinetic coefficients of friction of a given material can correspond to the roughness of the material. Thus, the coefficients of friction can be used to approximate the roughness of a material.

The nonwoven materials of the present Example were airlaid nonwoven materials. Two types of airlaid nonwoven materials were prepared via the pilot airlaid machine. Each nonwoven material had two layers. The first layer was composed of 5.7 dtex, 4 mm eccentric bicomponent fibers from FiberVisions. The bottom layer was composed of cellulose fluff (GP 4725) mixed with Trevira Type 257 (1.5 dtex, 6 mm, PE/PP) bicomponent fibers. 1.25 gsm of Vinnapas 192 was sprayed on the bottom side to control dust. Products 101615-11, 101615-12, & 101615-13 were constructed, using Trevira Type 245 PET fibers (6.7 dtex, 3 mm) for the top layer. The topside was sprayed with 6 gsm of Vinnapas 192. The bottom layer was composed of cellulose fluff (GP 4725) & Trevira Type 257 (1.5 dtex, 6 mm, polyethylene (PE)/polypropylene (PP)) bicomponent fibers. 1.25 gsm of binder (Vinnapas 192) was sprayed on the outer surface of the bottom layer. Various samples had overall basis weights of 50 gsm, 60 gsm, 70 gsm and 80 gsm. Various samples were stabilized at target processing temperatures of 138° C., 143° C., and 147° C. to create a rough outer surface on the nonwoven materials.

A Thwing-Albert FP-2260 Friction/Peel Tester was used to measure the static and kinetic coefficients of friction between the rough side of the nonwoven materials and a variety of surfaces. Samples of the nonwoven materials were cut and wrapped around a 200 g sled attached to a 2000 g load cell. The sled was pulled at a constant speed of 15 in/min and the force per distance values were recorded to create friction profiles for each nonwoven material. FIGS. 7A-7D provide the friction profiles of the various basis weight materials. FIG. 7A provides friction profiles for the 50 gsm materials, which were cured at processing temperatures of 138° C., 143° C., and 147° C. Similarly, FIGS. 7B, 7C, and 7D provide the friction profiles for the 60 gsm, 70 gsm, and 80 gsm materials, respectively. In lower basis weight nonwoven materials (e.g., 50 gsm and 60 gsm), the processing temperature during stabilization had a significant impact on the friction profile. These data suggest that controlling the processing temperature can impact the coefficients of friction and the roughness of nonwoven materials.

MAP-4 software was used to calculate static and kinetic coefficients of friction from the friction profiles. FIG. 8A provides the average static coefficient of friction and FIG. 8B provides the average kinetic coefficient of friction for the nonwoven materials across different processing temperatures when rubbed on a black glass surface. As shown in these Figures, the coefficients of friction were altered by varying the processing temperature. Similarly, FIGS. 9A and 9B provide the average static and kinetic coefficients of friction, respectively, for the nonwoven materials when rubbed on a ceramic surface. FIGS. 10A and 10B provide the average static and kinetic coefficients of friction, respectively, for the nonwoven materials when rubbed on a vinyl surface. FIGS. 11A and 11B provide the average static and kinetic coefficients of friction, respectively, for the nonwoven materials when rubbed against their own surfaces. These data suggest that the roughness of a nonwoven material can be altered by controlling the processing temperature during stabilization.

The same procedures were used to determine the static coefficient of friction for three commercially available materials. The commercially available materials were Clorox ("C"), Gojo ("G"), and Big Jobs ("B"). FIG. 12 provides the average static coefficients of friction for the nonwoven materials and the commercially available materials when rubbed on a ceramic surface, and FIG. 13 provides the same when rubbed on a vinyl surface. FIG. 14 provides the average static coefficients of friction of the nonwoven materials and the commercially available materials when rubbed against their own surfaces. As shown in these Figures, certain nonwoven materials having various processing temperatures can have increased coefficients of friction compared to commercially available materials. For example, in FIG. 12, and with respect to the 50 gsm nonwoven material, increasing the processing temperature of the nonwoven material can increase the static coefficient of friction to be greater than the static coefficient of friction of the commercially available materials.

Example 4: Cleaning Efficiency of Rough Nonwoven Materials

The present Example provides the cleaning efficiency of airlaid nonwoven materials whose surface topography and rigidity were stabilized at various processing temperatures.

The nonwoven materials were prepared via the pilot airlaid machine. Each nonwoven material had two layers. The top layer was composed of 5.7 dtex, 4 mm eccentric bicomponent fibers from FiberVisions. The bottom layer was composed of cellulose fluff (GP 4725) mixed with Trevira Type 257 (1.5 dtex, 6 mm, polyethylene (PE)/polypropylene (PP)) bicomponent fibers. 1.25 gsm of binder (Vinnapas 192) was sprayed on the outer surface of the bottom layer. Various samples had overall basis weights of 50 gsm, 60 gsm, 70 gsm and 80 gsm. Various samples were stabilized at processing temperatures ranging from 138° C. to 148° C.

To measure cleaning efficiency, standard procedure ASTM D4488-95 was performed. A BYK Gardner Spectrophotometer was used to record initial L values for clean 4 in.×4 in. flooring tiles. The flooring tiles were Armstrong 12 in.×12 in. chalk pattern Excelon Feature Tile, a commercially available vinyl tile. Each tile was dirtied with 0.05 g of urban soil, which was piled onto a portion of each tile. The tiles were further dirtied by adding an oil blend to the soil and swirling the soil into a circle having a diameter of about 2.5 in. The urban soil/oil blend was according to ASTM D4488 A5.4.2. Note that the soil was swirled using a paper towel and about 60-70% of the soil was removed by this process. The tiles were dried overnight. The spectrophotometer was used to record soiled L values for each tile, which correspond to the amount of soil on the dirtied tiles.

Using a Gardner Abrasion Tester, the dirtied tiles were wetted with 4:1 w/w standard water and cleaned using a sample of a nonwoven material for five cleaning cycles. The tiles were dried overnight. The spectrophotometer was used to record clean L values for each tile, which correspond to the amount of soil remaining.

Cleaning efficiency was quantified as the percentage of soil removed by the sample of nonwoven material. Particularly, cleaning efficiency was calculated by determining the amount of mess removed (i.e., the difference between the L values of the times after cleaning and the L values of the tiles before cleaning) as a percentage of the original amount of mess (i.e., the difference between the initial L values of the tiles and the L values of the tiles before cleaning). The formula of cleaning efficiency can be described as:

Cleaning Efficiency=[(L value of cleaned tile)−(L value of soiled tile)]/[(initial L value of tile)−(L value of soiled tile)]×100%

The test was repeated using two commercially available products (Clorox and Gojo) to provide a comparison. Table 1 provides the average cleaning efficiencies of samples having various basis weights and processing temperatures, as well as the average cleaning efficiencies of the commercially available products.

TABLE 1

| Sample | Basis Weight | Temp. | % Cleaning Efficiency | Standard Deviation |
|---|---|---|---|---|
| 101615-1 | 50 | 138 | 31.56 | 8.25 |
| 101515-12 | 50 | 143 | 22.14 | 4.81 |
| 101515-11 | 50 | 146 | 19.45 | 5.63 |
| 101615-2 | 60 | 138 | 20.16 | 4.44 |
| 101615-3 | 60 | 143 | 24.82 | 5.12 |
| 101615-4 | 60 | 147 | 20.95 | 6.11 |
| 101615-8 | 70 | 138 | 23.19 | 6.57 |
| 101615-9 | 70 | 143 | 16.19 | 7.00 |
| 101615-10 | 70 | 148 | 15.86 | 4.01 |
| 101615-5 | 80 | 139 | 24.66 | 6.67 |
| 101615-6 | 80 | 143 | 19.98 | 6.10 |
| 101615-7 | 80 | 148 | 22.87 | 5.67 |
| Clorox | | | 16.51 | 5.99 |
| Gojo | | | 16.13 | 4.18 |

FIG. 15 provides a graphical representation of the data in Table 1. In FIG. 15, the shades of the bar correspond to the target processing temperature of the nonwoven material. Thus, for example, the 50 gsm nonwoven material that was stabilized at a target temperature of 147° C. was actually stabilized at a temperature of 146° C., as described in Table 1. These data show that in the lower basis weight materials, cleaning efficiency decreased as the processing temperature increased. This is perhaps due to the decrease in surface area caused by the increased crimping of the nonwoven materials at higher processing temperatures. Nonetheless, the nonwoven materials showed improved cleaning efficiency over commercially available products. Notably, the nonwoven materials having lower basis weights (e.g., 50 gsm and 60 gsm) showed significantly improved cleaning efficiency compared to commercially available products. These data suggest that the rough nonwoven materials of the presently disclosed subject matter have improved qualities compared to commercially available cleaning products.

Example 5: Cleaning Efficiency and Roughness of Nonwoven Materials

The present Example correlates the cleaning efficiency data provided in Example 4 with the roughness of the nonwoven materials.

The procedure described in Example 3 was used to generate a friction profile for each of the nonwoven materials of Example 4. The peak static force (i.e., the peak force on the friction profile) and the kinetic force (i.e., the average force applied to move the sled with the nonwoven material attached) were determined from the friction profiles.

FIG. 16 provides a plot of the peak static force compared to the cleaning efficiency. FIG. 16 also includes a trend line, showing that cleaning efficiency increases as peak static force increases. Similarly, FIG. 17 provides a plot of the kinetic force compared to the cleaning efficiency, as well as a trend line. The trend line shows that cleaning efficiency increases as kinetic force increases.

Peak static force and kinetic force correspond to the static coefficient of friction and the kinetic coefficient of friction, respectively. As discussed above, the coefficients of friction can be used to approximate the roughness of a material. Thus, these data suggest that as the roughness of the nonwoven materials increases, so does the cleaning efficiency of those materials. Therefore, providing a rough outer surface to a nonwoven woven material can increase its utility for cleaning purposes.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

Various patents and patent applications are cited herein, the contents of which are hereby incorporated by reference herein in their entireties.

What is claimed is:

1. A multi-layer nonwoven material, comprising:
a first outer layer comprising from about 10 gsm to about 50 gsm of bicomponent fibers; and
a second outer layer comprising synthetic fibers and optionally cellulose fibers,
wherein the first outer layer is heat-treated to provide a rough outer surface having a static coefficient of friction ranging from about 0.01 to about 3.0 and a kinetic coefficient of friction ranging from about 0.0001 to about 2.0,
wherein the synthetic fibers comprise bicomponent fibers,
wherein the first outer layer comprises bicomponent fibers having a first dtex value and the second outer layer comprises bicomponent fibers having a second dtex value, and wherein the first dtex value is greater than the second dtex value.

2. The multi-layer nonwoven material of claim 1, wherein at least one of the first outer layer and the second outer layer comprises binder.

3. The multi-layer nonwoven material of claim 1, wherein the second outer layer comprises both cellulose fibers and synthetic fibers.

4. The multi-layer nonwoven material of claim 1, further comprising an intermediate layer.

5. The multi-layer nonwoven material of claim 4, wherein the intermediate layer comprises cellulose fibers.

6. The multi-layer nonwoven material of claim 5, wherein the intermediate layer comprises bicomponent fibers.

7. The multi-layer nonwoven material of claim 1, further comprising a first intermediate layer, disposed between the first outer layer and the second outer layer, and comprising cellulose fibers.

8. The multi-layer nonwoven material of claim 7, further comprising a second intermediate layer, disposed adjacent to the first outer layer, and comprising bicomponent fibers.

9. The multi-layer nonwoven material of claim 8, further comprising a third intermediate layer, disposed adjacent to the second outer layer, and comprising bicomponent fibers.

10. The multi-layer nonwoven material of claim 1, wherein the multi-layer nonwoven material is heat-treated at a temperature of from about 110° C. to about 200° C.

11. The multi-layer nonwoven material of claim 1, wherein the multi-layer nonwoven material is heat-treated at a temperature of from about 135° C. to about 150° C.

\* \* \* \* \*